United States Patent
Kuzuya

(10) Patent No.: US 9,558,406 B2
(45) Date of Patent: Jan. 31, 2017

(54) IMAGE PROCESSING APPARATUS INCLUDING AN OBJECT SETTING SECTION, IMAGE PROCESSING METHOD, AND PROGRAM USING THE SAME

(71) Applicant: Sony Corporation, Tokyo (JP)

(72) Inventor: Naoki Kuzuya, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 109 days.

(21) Appl. No.: 14/312,170

(22) Filed: Jun. 23, 2014

(65) Prior Publication Data

US 2015/0016673 A1    Jan. 15, 2015

(30) Foreign Application Priority Data

Jul. 9, 2013   (JP) ................................. 2013-143209

(51) Int. Cl.
*G06K 9/00*          (2006.01)
(52) U.S. Cl.
CPC ................................ *G06K 9/00671* (2013.01)
(58) Field of Classification Search
None
See application file for complete search history.

(56) References Cited

U.S. PATENT DOCUMENTS

| | | | | |
|---|---|---|---|---|
| 2004/0081338 | A1* | 4/2004 | Takenaka ........... | G08B 13/1961 382/118 |
| 2006/0110029 | A1* | 5/2006 | Kazui ................ | G06K 9/00228 382/159 |
| 2007/0297650 | A1* | 12/2007 | Rabinovich ........ | G06K 9/00288 382/118 |
| 2015/0016673 | A1* | 1/2015 | Kuzuya .............. | G06K 9/00671 382/103 |

FOREIGN PATENT DOCUMENTS

JP        2008-131405        6/2008

* cited by examiner

*Primary Examiner* — Tahmina Ansari
(74) *Attorney, Agent, or Firm* — K&L Gates LLP

(57) ABSTRACT

An image processing apparatus includes: an object setting section that sets an object image indicating an object which is placed in an image generated by an image capturing section; a detection section that detects the object included in a synthetic image in which the object image and the image generated by the image capturing section are synthesized; and an output section that outputs output information for setting a detection parameter used in a detection process performed by the detection section, that is, output information in which the synthetic image and a detection result of the detection process are associated.

15 Claims, 17 Drawing Sheets

IMAGE PROCESSING APPARATUS INCLUDING AN OBJECT SETTING SECTION, IMAGE PROCESSING METHOD, AND PROGRAM USING THE SAME

CROSS REFERENCES TO RELATED APPLICATIONS

The present application claims priority to Japanese Priority Patent Application JP 2013-143209 filed in the Japan Patent Office on Jul. 9, 2013, the entire content of which is hereby incorporated by reference.

BACKGROUND

The present application relates to an image processing apparatus. Specifically, the present application relates to an image processing apparatus and an image processing method capable of dealing with an image, and a program causing a computer to implement the method.

In the related art, image processing apparatuses such as an image capturing device, which captures an image of a subject such as a person and generates the image (image data), have come into widespread use. Further, there has been proposed a subject recognition technique of detecting an object such as a moving object or a person included in an image generated in such a manner.

For example, there has been proposed an image processing apparatus that detects a face of a person included in an image through image processing using a feature amount such as luminance or color (for example, refer to Japanese Unexamined Patent Application Publication No. 2008-131405).

SUMMARY

According to the above-mentioned related art, it is possible to detect an object such as a moving object or a person included in an image.

Here, for example, it is conceivable that an apparatus (for example, image capturing device) that captures an image of a subject is provided outdoors, and the image capturing range for a monitoring target of the apparatus is in an outdoor location. In such a case, in accordance with the difference between day and night, the difference in the weather, the difference in the plant growth, and the like, the situation in the image capturing range for the monitoring target may change every day. Hence, it is important to appropriately set detection parameters for detecting the object as a monitoring target.

According to the present application, it is desirable to appropriately set the detection parameters.

According to a first embodiment of the present application, there are provided an image processing apparatus, an image processing method thereof, and a program causing a computer to implement the method. The image processing apparatus includes: an object setting section that sets an object image indicating an object which is placed in an image generated by an image capturing section; a detection section that detects the object included in a synthetic image in which the object image and the image generated by the image capturing section are synthesized; and an output section that outputs output information for setting a detection parameter used in a detection process performed by the detection section, that is, output information in which the synthetic image and a detection result of the detection process are associated. Thereby, this configuration has the following effect. The object included in the synthetic image is detected, and the output information (the output information in which the synthetic image and the detection result are associated) for setting the detection parameter used in the detection process is output.

In the first embodiment, the detection parameter may be at least one of a parameter for setting a detection rule used when the detection process is performed and a parameter for adjusting a detection sensitivity of the detection process, and the detection section may perform the detection process by using the set detection parameter. Thereby, this configuration has the following effect. At least one parameter of the parameter for setting the detection rule and the parameter for adjusting the detection sensitivity is set, and the detection process is performed by using the set detection parameter.

In the first embodiment, the detection parameter may be a parameter for detecting predetermined movement of the object included in the synthetic image, and the detection section may detect whether or not the object included in the synthetic image performs the predetermined movement. Thereby, this configuration has the following effect. The parameter, which is for detecting the predetermined movement of the object included in the synthetic image, is set, and whether or not the object included in the synthetic image performs the predetermined movement is detected.

In the first embodiment, the detection parameter may be a parameter for specifying a registered region of the image generated by the image capturing section, and the detection section may detect whether or not the object included in the synthetic image enters into the registered region. Thereby, this configuration has the following effect. The parameter for specifying the registered region is set, and whether or not the object included in the synthetic image enters into the registered region is detected.

In the first embodiment, the output section may display notification information, which is for notifying that the object enters into the registered region, over the synthetic image. Thereby, this configuration has the following effect. The notification information, which is for notifying that the object enters into the registered region, is displayed over the synthetic image.

In the first embodiment, the output section may output notification information, which is for notifying that the object is detected from the synthetic image, in a state where the notification information is included in the output information. Thereby, this configuration has the following effect. The notification information, which is for notifying that the object is detected from the synthetic image, is output in a state where the notification information is included in the output information.

In the first embodiment, the object setting section may set appearance and movement of the object which is placed in the image generated by the image capturing section, and the detection section may perform the detection process on the synthetic image in which the object image specified by the set appearance and movement of the object is synthesized. Thereby, this configuration has the following effect. The appearance and movement of the object, which is placed in the image generated by the image capturing section, is set, and the detection process may be performed on the synthetic image in which the object image specified by the appearance and movement is synthesized.

In the first embodiment, the object setting section may set a path in which the object image is placed in the image generated by the image capturing section, and the detection section may perform the detection process on the synthetic image in which the object image is synthesized in the path.

Thereby, this configuration has the following effect. The path, in which the object image is placed in the image generated by the image capturing section, is set, and the detection process is performed on the synthetic image in which the object image is synthesized in the path.

In the first embodiment, the object setting section may set a plurality of positions at which the object image is intended to be placed in the path, and the detection section may perform the detection process on a plurality of the synthetic images each of which has the object image synthesized at each of the plurality of positions. Thereby, this configuration has the following effect. The plurality of positions at which the object image is intended to be placed in the path is set, and the detection process is performed on the plurality of the synthetic images each of which has the object image synthesized at each of the plurality of positions.

In the first embodiment, the object image may be generated by computer graphics. Thereby, this configuration has the following effect. The object image is generated by computer graphics.

In the first embodiment, the object image may be generated by synthesizing a texture image and an object contour image indicating a contour of the object. Thereby, this configuration has the following effect. The object image is generated by synthesizing a texture image and an object contour image indicating a contour of the object.

In the first embodiment, the object image may be generated by photographing the object. Thereby, this configuration has the following effect. The object image is generated by photographing the object.

According to a second embodiment of the present application, there are provided an image processing apparatus, an image processing method thereof, and a program causing a computer to implement the method. The image processing apparatus includes: an object setting section that sets an object image indicating an object which is placed in an image generated by an image capturing section; a detection section that detects the object included in a synthetic image in which the object image and the image generated by the image capturing section are synthesized; and a detection parameter setting section that sets a detection parameter, which is used in a detection process performed by the detection section, on the basis of a detection result obtained by the detection section. Thereby, this configuration has the following effect. The object included in the synthetic image is detected, and the detection parameter used in the detection process is set on the basis of the detection result.

According to the embodiments of the present application, it is possible to obtain an excellent effect capable of appropriately setting the detection parameter.

Additional features and advantages are described herein, and will be apparent from the following Detailed Description and the figures.

DETAILED DESCRIPTION

Hereinafter, modes for carrying out the present application (hereinafter referred to as embodiments) will be described.

Description will be given in the following order:

1. First Embodiment (an example in which a detection parameter is set on the basis of a detection result of an object detection process using a pseudo object image);
2. Second Embodiment (an example in which an image used as a pseudo object image is captured by an image capturing device and the pseudo object image is generated in advance);
3. Third Embodiment (an example in which the detection parameter is automatically set); and
4. Fourth Embodiment (an example of an image processing system formed of a plurality of devices).

1. First Embodiment

Configuration Example of Image Processing Apparatus

Figure 1:
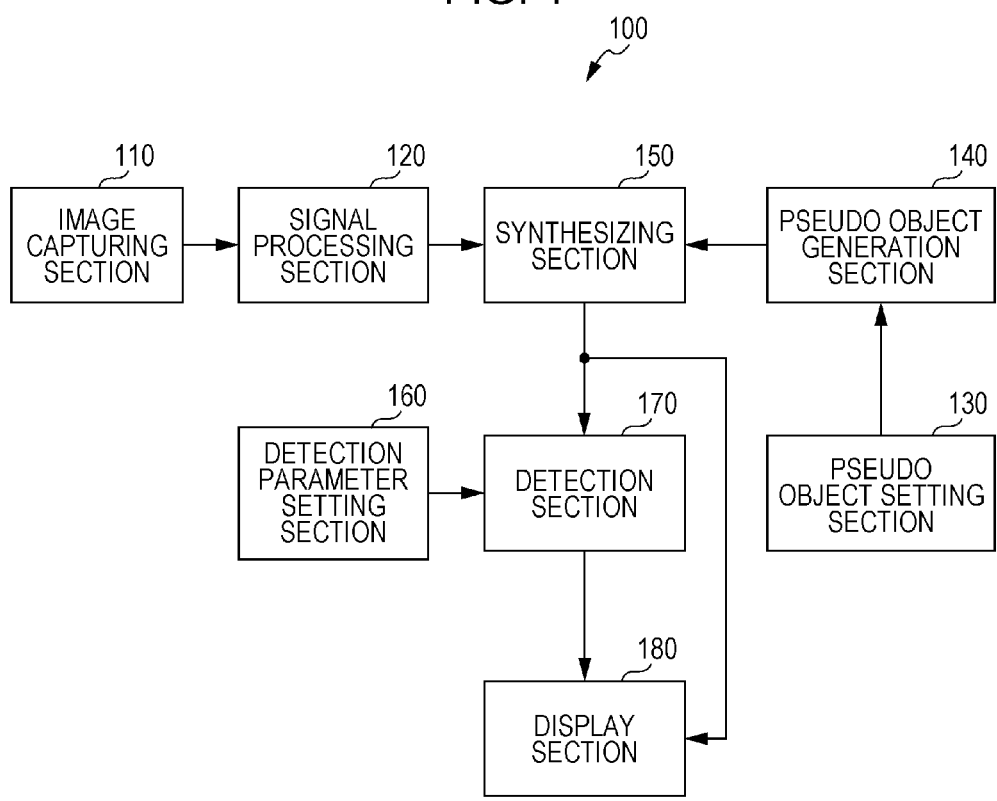
FIG. 1 is a block diagram illustrating a functional configuration example of an image processing apparatus according to a first embodiment of the present application.

FIG. 1 is a block diagram illustrating a functional configuration example of an image processing apparatus 100 according to a first embodiment of the present application.

The image processing apparatus 100 includes an image capturing section 110, a signal processing section 120, a pseudo object setting section 130, a pseudo object generation section 140, a synthesizing section 150, a detection parameter setting section 160, a detection section 170, and a display section 180. The image processing apparatus 100 is realized by, for example, an object detection device or an image capturing device (for example, a surveillance camera that detects a certain event for a monitoring target) for monitoring whether an intruder enters into a registered region (for example, no-entry region). Further, in the first embodiment of the present application, description will be given of an example of an image processing apparatus that fixes the image capturing range for the monitoring target (for example, an image processing apparatus that fixes an image capturing section which captures an image in the image capturing range for the monitoring target).

The image capturing section 110 captures an image of a subject included in the image capturing range for the monitoring target so as to generate the image (image data), and outputs the generated image to the signal processing section 120. The image capturing section 110 is formed of, for example, an optical system (a plurality of lenses), and an imaging device. Further, for example, the image processing apparatus 100 may acquire an image, which is generated by another image capturing device, instead of being provided with the image capturing section 110. In addition, in the embodiment of the present application, the described term "image" is defined to include both meanings of an image and the image data for displaying the image.

The signal processing section 120 performs a predetermined signal processing (for example, demosaic processing) on the image which is output from the image capturing section 110, and outputs the image, which is subjected to the signal processing, to the synthesizing section 150.

The pseudo object setting section 130 sets a pseudo object image (for example, a pseudo image which represents a person), which is generated by the pseudo object generation section 140, on the basis of a user's operation. That is, the pseudo object setting section 130 sets the pseudo object image which is placed in the image generated by the image capturing section 110. As the setting for the pseudo object image, for example, setting of pseudo object parameters, which are for specifying the type (for example, the shape, and the pattern) of the pseudo object, the size thereof, the movement thereof, and the position thereof in the image, is performed. It should be noted that the pseudo object setting section 130 is an example of the object setting section described in claims.

The pseudo object generation section 140 generates the pseudo object image, on the basis of the contents which are set by the pseudo object setting section 130, and outputs the generated pseudo object image to the synthesizing section 150.

The synthesizing section 150 synthesizes the pseudo object image, which is output from the pseudo object generation section 140, with the image which is output from the signal processing section 120 so as to generate a synthetic image, and outputs the generated synthetic image to the detection section 170 and the display section 180.

The detection parameter setting section 160 sets detection parameters, which are used in the detection process performed by the detection section 170, on the basis of the user's operation.

The detection section 170 analyzes the synthetic image, which is output from the synthesizing section 150, on the basis of the detection parameters set by the detection parameter setting section 160, and detects whether or not the event for the detection target (for example, entry of a person into the no-entry region) arises. That is, the detection section 170 detects a specific object (for example, the person entering into the no-entry region) included in the synthetic image which is output from the synthesizing section 150. Then, the detection section 170 outputs the detection result to the display section 180.

Here, the detection parameters are used in, for example, adjustment of setting values or setting of rules having effects on performance (detection performance) and a function (detection function) of the detection section 170. For example, the detection parameters are a parameter, which is for setting the rule (detection rule) used when the detection process is performed by the detection section 170, and a parameter which is for adjusting the detection sensitivity of the detection process performed by the detection section 170. Further, at least one of the parameters may be a settable parameter.

Here, as the detection rule, for example, a method of detecting the object can be defined. As the detection rule, for example, a detection method of detecting predetermined movement of the object can be defined. The predetermined movement may include, for example, entry into (or, staying in for a certain time period) a registered region (for example, a no-entry region), movement (passing through a registered path) in a registered path (for example, a no-entry path), carrying out of a registered object (for example, object not to be carried out), and leaving of an object. For example, when the entry into the registered region is detected as the predetermined movement, the parameter (for example, coordinates of the vertex of the registered region) for specifying the registered region can be set as the detection parameter. Further, for example, when the movement in the registered path is detected as the predetermined movement, the parameter (for example, coordinates of the line segment corresponding to the registered path) for specifying the registered path can be set as the detection parameter. Furthermore, for example, when the carrying out of the registered object (for example, the object not to be carried out) is detected as the predetermined movement, the parameter (for example, a time period in which the registered object is not present) for detecting the carrying out of the registered object can be set as the detection parameter. Moreover, for example, when the leaving of the object is detected as the predetermined movement, the parameter (for example, a time period which has passed after the object became present) for detecting the leaving of the object can be set as the detection parameter.

Further, when the detection sensitivity is adjusted, threshold values, which are used when the detection section 170 performs the detection process, can be set as the detection parameters. For example, the detection method of detecting the object included in the synthetic image may be used on the basis of whether or not an absolute value of a difference in luminance between the synthetic image, which is generated by the synthesizing section 150, and the background image (the image in which the object as a detection target is not included) is greater than a threshold value as a reference value. In this case, by changing the threshold value, it is possible to adjust the detection sensitivity. Furthermore, for example, at least one of the minimum size and the maximum size of the object as the detection target may be set as the detection parameter. Moreover, for example, a detection resolution may be set as the detection parameter.

The display section 180 displays the synthetic image, which is output from the synthesizing section 150, and the detection result which is output from the detection section 170. For example, the display section 180 displays the detection result (a position of the detected person, an alarm indicating the entry, and the like), which is output from the detection section 170, over the synthetic image which is output from the synthesizing section 150. That is, the display section 180 outputs output information (output information in which the synthetic image and the detection result obtained by a detection section 170 are associated) for setting the detection parameters used in the detection process performed by the detection section 170. In this case, the display section 180 is able to output notification information (notification information for notifying the detection result which is output from the detection section 170) for notifying that the object is detected from the synthetic image in a state where the notification information is included in the output information. For example, the display section 180 displays notification information (for example, a frame 211 shown in FIG. 2C), which is for notifying that the object enters into the registered region, over the synthetic image. In addition, the display section 180 is an example of the output section described in claims. Further, a sound output section, which outputs sound information corresponding to the detection result, may be provided in the image processing apparatus 100.

The detection section 170 may perform the detection process on all the images (all the frames) generated by the image capturing section 110, and may perform the detection process for each predetermined interval (for example, for every single minute).

Example of Relationship Between Detection Parameter and Detection Result

Figure 2A:
FIGS. 2A to 2C are diagrams illustrating examples of a relationship between a detection result obtained by a detection section and a detection parameter which is set by a detection parameter setting section according to the first embodiment of the present application.
Figure 2B:
Figure 2C:
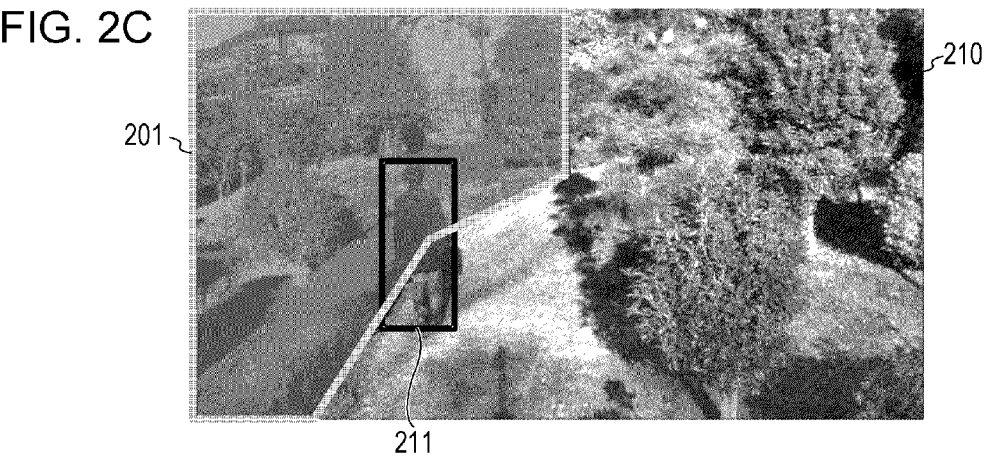

FIGS. 2A to 2C are diagrams illustrating examples of a relationship between the detection result obtained by the detection section 170 and the detection parameter which is set by the detection parameter setting section 160 according to the first embodiment of the present application.

FIG. 2A shows an image 200 which is generated by the image capturing section 110. The image 200 is, as described above, an image corresponding to the image capturing range for the monitoring target set by the image processing apparatus 100, and an image in which the object (for example, intruder) that has entered is not present.

FIG. 2B shows a relationship between a no-entry region (registered region) 201 and an image 200 which is generated by the image capturing section 110. In FIG. 2B, on the image 200, the no-entry region (registered region) 201 is surrounded by a frame, and the range of the frame is represented by coloring the inside of the range. Here, the no-entry region (registered region) means a region which is specified by the detection parameter set by the detection parameter setting section 160.

FIG. 2C shows a relationship between the no-entry region 201 and the person included in an image 210 which is generated by the image capturing section 110. In FIG. 2C, on the image 210, the person is surrounded by a frame 211, and the range of the frame is represented by coloring the inside of the range.

Here, for example, an alarm may be output (for example, a sound output of the alarm message is performed, or an image of the alarm message is displayed) on the image generated by the image capturing section 110 when someone enters into the no-entry region 201. For example, in FIG. 2C, the person included in the image 210 (the person in the frame 211) has not entered into the no-entry region 201, but overlaps with the no-entry region 201 in the image 210.

As described above, as the person has not entered into the no-entry region 201 but overlaps with the no-entry region 201, there is a concern that the detection section 170 may perform false detection. Hence, it is important to appropriately set the detection parameters used in the detection process performed by the detection section 170.

Examples of Generation of Pseudo Object Image

Figure 3A:
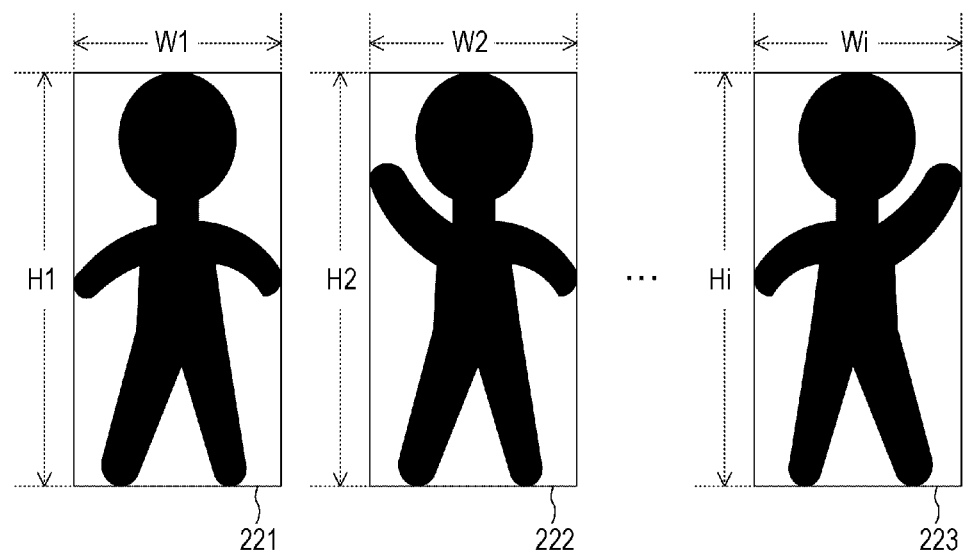
FIGS. 3A and 3B are diagrams illustrating an example of subject matters which are used in generating pseudo object images through a pseudo object generation section according to the first embodiment of the present application.
Figure 3B:
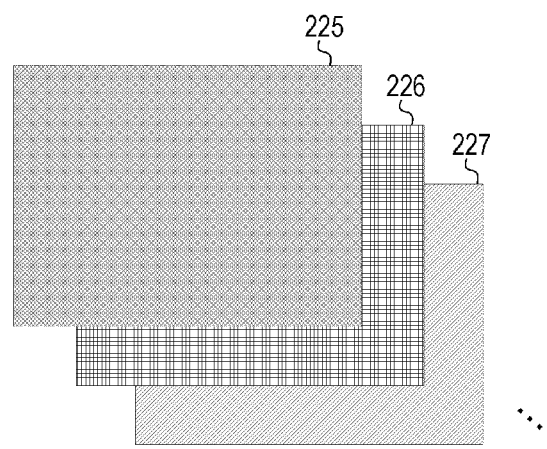

FIGS. 3A and 3B are diagrams illustrating an example of subject matters which are used in generating pseudo object images through the pseudo object generation section 140 according to the first embodiment of the present application.

FIG. 3A shows various object contour images 221 to 223. The object contour images 221 to 223 are, for example, images indicating contours of human bodies with various body shapes and poses, and images with various widths Wi and heights Hi. As the object contour images 221 to 223, for example, it is possible to use binary images indicating outer shapes of subjects. For example, the binary image is an image of which the subject portion is represented by black and the portion other than the subject is represented by white.

FIG. 3B shows texture images 225 to 227 having various patterns. In addition, in the first embodiment of the present application, as the object contour images, only three object contour images 221 to 223 are shown, but other object contour images are not shown. Likewise, in the first embodiment of the present application, as the texture images, only three texture images 225 to 227 are shown, but other object contour images are not shown.

For example, the pseudo object generation section 140 stores the object contour images 221 to 223 and the texture images 225 to 227. Then, the pseudo object generation section 140 pastes a certain texture image of the texture images 225 to 227 to a certain object contour image of the object contour images 221 to 223, thereby generating a pseudo object image. In this case, the pseudo object generation section 140 determines combination of the object contour image and the texture image, on the basis of the pseudo object parameters which are set by the pseudo object setting section 130. Further, the pseudo object image is generated by, for example, computer graphics.

Figure 10:
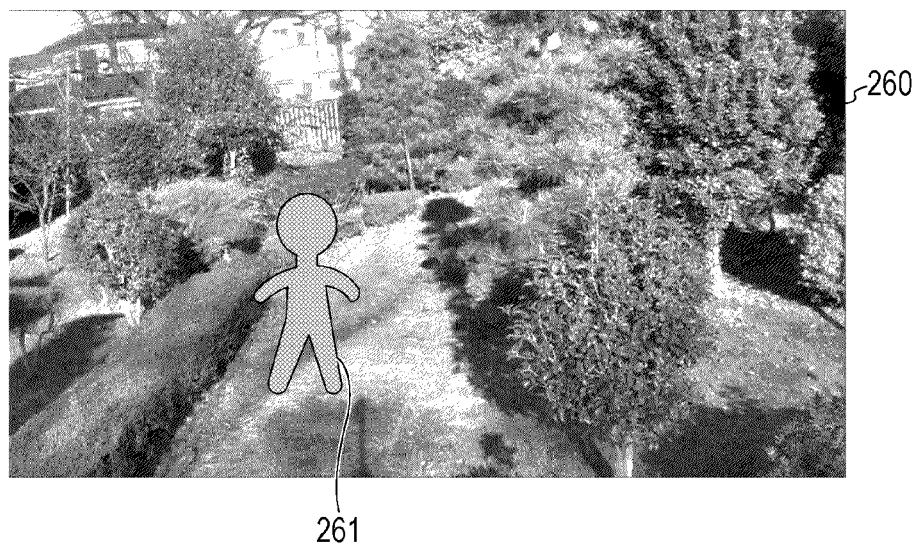
FIG. 10 is a diagram illustrating an example of a synthetic image which is synthesized by a synthesizing section according to the first embodiment of the present application.

The synthesizing section 150 synthesizes the pseudo object image, which is generated by the pseudo object generation section 140, with the image, which is generated by the image capturing section 110, so as to generate a synthetic image. Through the synthesizing process, the pseudo object image, which is the object contour image having a desired pattern (texture image), is superposed upon the image, which is generated by the image capturing section 110, such that it seems that a person is present at a desired position in view of a camera position. An example of the synthetic image is shown in FIG. 10. It should be noted that the synthesizing section 150 may directly generate the synthetic image by using the object contour images 221 to 223 and the texture images 225 to 227 stored in the pseudo object generation section 140.

Example of Setting of Camera Information

Next, an example of setting of camera information will be described. Here, the camera information is, for example, information that includes an installation position of a camera, an angle of view of the camera, and a size (wimg, himg) of the image which is generated by the camera. It should be noted that the camera 111 to be described later corresponds to the image capturing section 110 shown in FIG. 1.

Figure 4A:
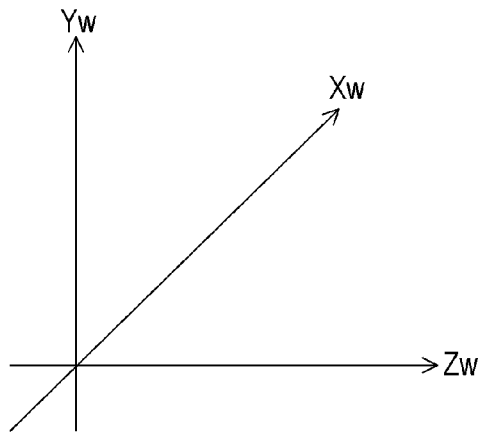
FIGS. 4A and 4B are diagrams schematically illustrating an installation position and an installation angle of a camera according to the first embodiment of the present application.
Figure 4B:
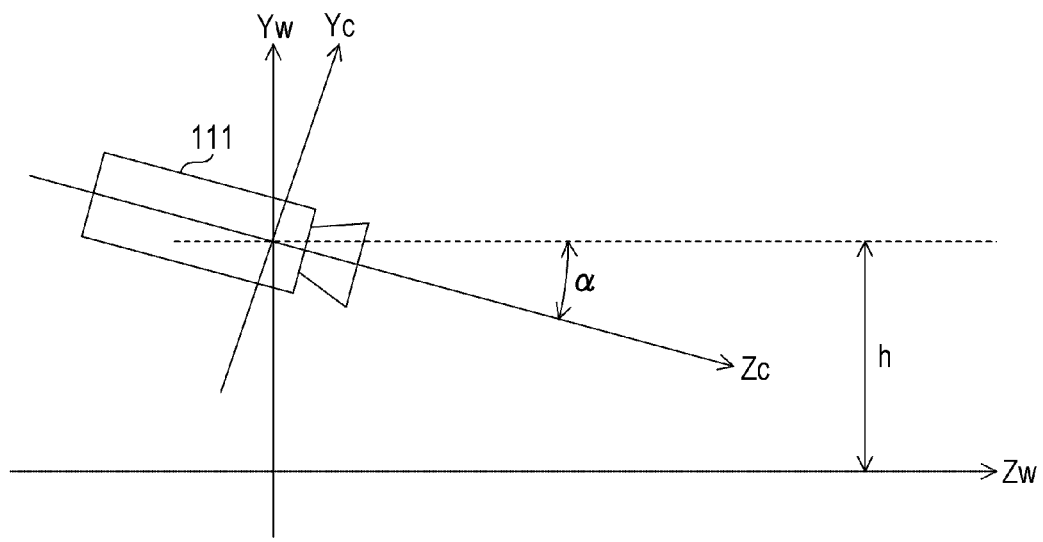

FIGS. 4A and 4B are diagrams schematically illustrating an installation position and an installation angle of the camera 111 according to the first embodiment of the present application. It should be noted that FIG. 4A shows a world coordinate system for specifying space in which the camera 111 is provided.

As shown in FIG. 4A, in the first embodiment of the present application, three-dimensional space is indicated by the world coordinate system (xyz coordinates). Specifically, the plane, which is horizontal to the ground, is indicated by an x axis and a z axis (xz coordinates). Further, the vertical direction, which is vertical to the ground, is indicated by a y axis.

FIG. 4B shows the installation position and the installation angle of the camera 111 as viewed in the direction of the x axis. For example, the height of the camera 111 (the installation position (ground height) of the camera 111) from the ground is represented by h. In addition, the installation angle of the camera 111 from the horizontal surface is represented by cc. The camera 111 is provided on the y axis as described above.

Figure 5A:
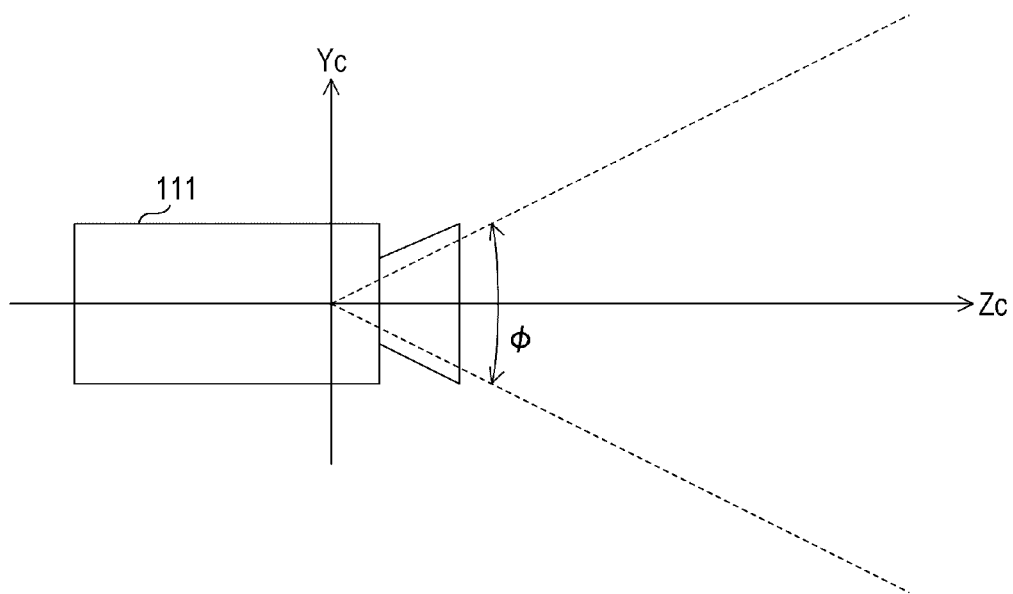
FIGS. 5A and 5B are diagrams schematically illustrating angles of view of the camera according to the first embodiment of the present application.
Figure 5B:
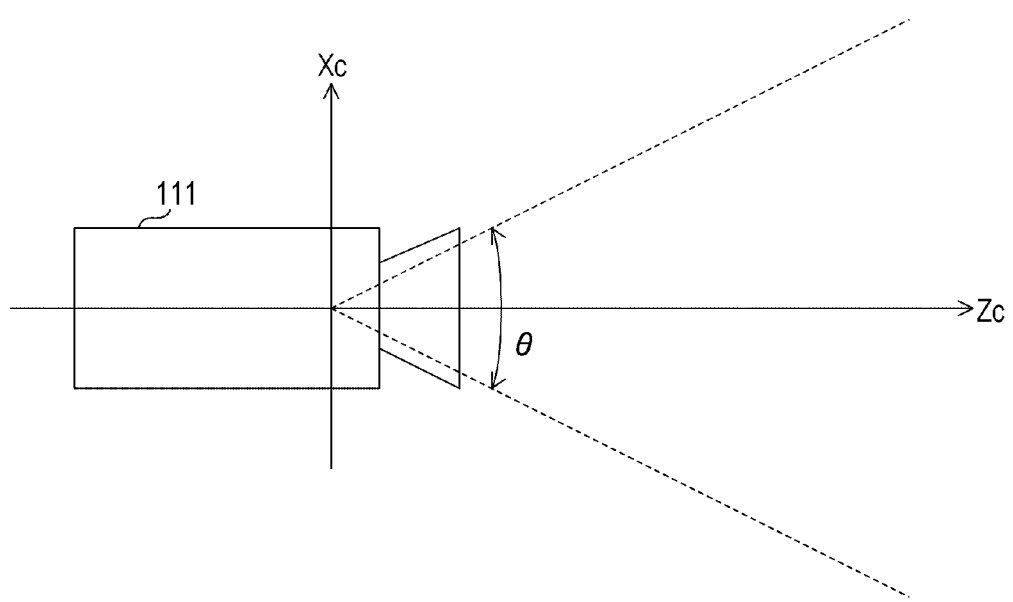

FIGS. 5A and 5B are diagrams schematically illustrating angles of view of the camera 111 according to the first embodiment of the present application.

FIG. 5A shows an angle of view $\phi$ of the camera 111 as viewed from the direction of the x axis. The angle of view is a so-called vertical angle of view, and is, for example, an angle of view corresponding to an angle from the top to the bottom of the frame.

FIG. 5B shows an angle of view $\theta$ of the camera 111 as viewed from the direction of the y axis. The angle of view is a so-called horizontal angle of view, and is, for example, an angle of view corresponding to an angle from the left end to the right end of the frame.

Example of Setting of Pseudo Object Information

Next, an example of the setting of the pseudo object information will be described. Here, the pseudo object information is, for example, information that includes information on selection of the object contour image, the object size, selection of the texture, and the path of movement of the object. In addition, the object size is, for example, represented by the width Wo and the height Ho shown in FIG. 6. Further, the information on the path of movement of the object is, for example, the time-series position and direction of the object, and is, for example, coordinates (xp, zp) and an angle $\beta$ shown in FIG. 7.

In the first embodiment of the present application, a method of setting the pseudo object information will be described using four types of coordinate system. Specifically, the description will be given using the following four types of coordinate system: the world coordinate system shown in FIG. 4A; the object coordinate system shown in FIG. 6; the camera coordinate system shown in FIG. 8; and the screen coordinate system shown in FIG. 9.

Object Coordinate System

Figure 6:
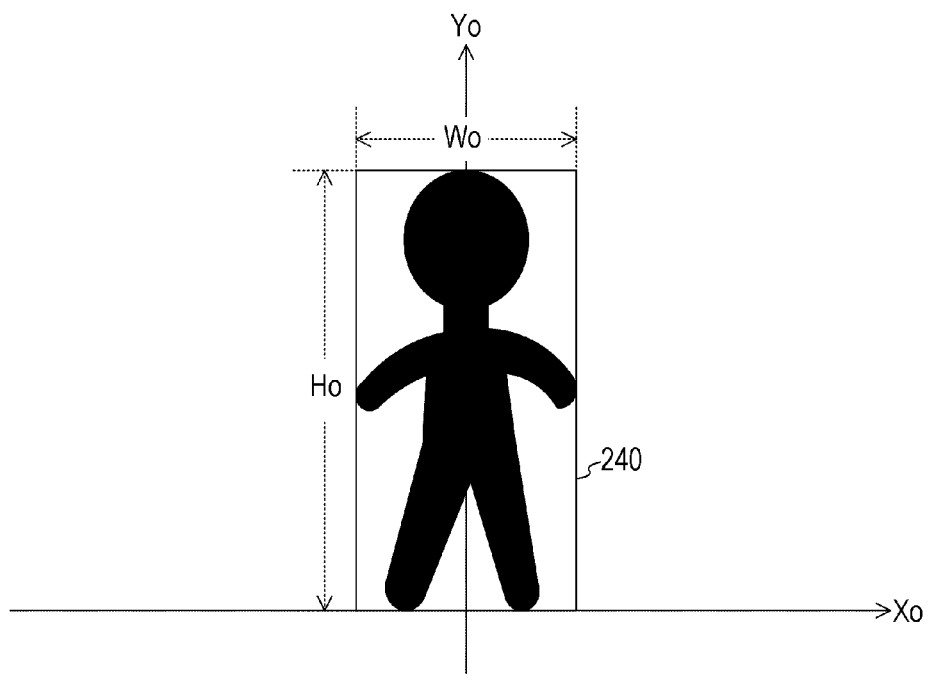
FIG. 6 is a diagram illustrating an object coordinate system of a pseudo object image which is generated by the pseudo object generation section according to the first embodiment of the present application.

FIG. 6 is a diagram illustrating an object coordinate system of a pseudo object image which is generated by the pseudo object generation section 140 according to the first embodiment of the present application.

As shown in FIG. 6, in the object coordinate system, coordinates have a coordinate axis at the center of the bottom of the two-dimensional object image 240. It should be noted that the Zo axis of the object coordinate system is set as a depth direction.

Figure 7:
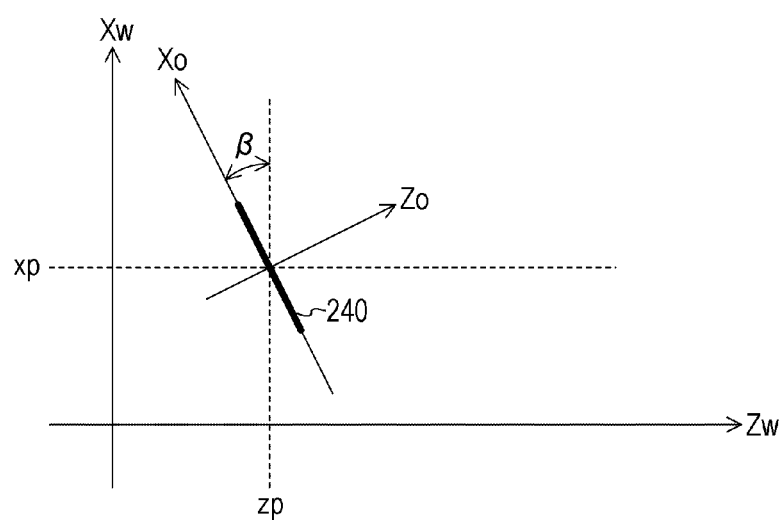
FIG. 7 is a diagram illustrating an example of a case where the object coordinate system of the pseudo object image is placed in a world coordinate system, wherein the pseudo object image is generated by the pseudo object generation section according to the first embodiment of the present application.

FIG. 7 is a diagram illustrating an example of a case where the object coordinate system of the pseudo object image is placed in a world coordinate system, wherein the pseudo object image is generated by the pseudo object generation section 140 according to the first embodiment of the present application. In FIG. 7, the portion corresponding to the object image 240 shown in FIG. 6 is indicated by the heavy line.

As shown in FIG. 7, the Xw-Zw plane of the world coordinate system shown in FIG. 4A coincides with the Xo-Zo plane of the object coordinate system shown in FIG. 6. That is, the bottom of the object image 240 is in contact with the ground.

As shown in FIG. 7, the object coordinate system is rotated by the angle $\beta$ from the world coordinates at the coordinates (xp, zp) on the Xw-Zw plane of the world coordinate system. That is, the position of the object image 240 is specified by the angle $\beta$ and the coordinates (xp, zp) on the Xw-Zw plane of the world coordinate system.

Camera Coordinate System

Figure 8:
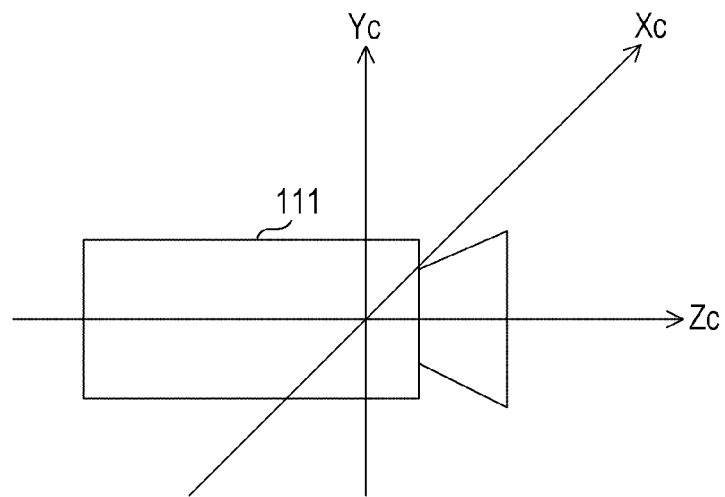
FIG. 8 is a diagram illustrating a camera coordinate system of the camera according to the first embodiment of the present application.

FIG. 8 is a diagram illustrating the camera coordinate system of the camera 111 according to the first embodiment of the present application. Further, FIG. 4B shows a relationship between the camera coordinate system and the world coordinate system.

As shown in FIG. 8, the Zc axis of the camera coordinate system coincides with the optical axis of the camera 111. Further, the Yc axis of the camera coordinate system coincides with the vertical direction of the camera 111, and the Xc axis of the camera coordinate system coincides with the lateral direction (horizontal direction) of the camera 111.

As shown in FIG. 4B, the camera 111 is provided at the location at the ground height h. Further, the camera 111 is provided such that the direction, after rotation by the angle $\alpha$ from the horizontal direction, is set as the optical axis direction.

Screen Coordinate System

Figure 9:
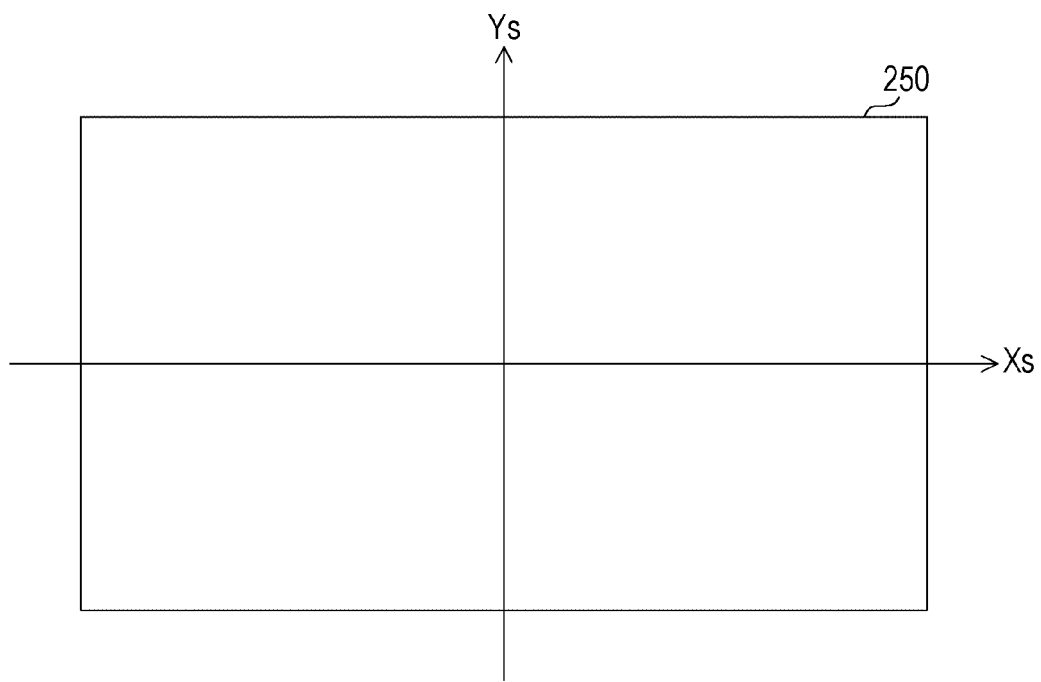
FIG. 9 is a diagram illustrating a screen coordinate system of an image which is generated by the camera according to the first embodiment of the present application.

FIG. 9 is a diagram illustrating a screen coordinate system of the image which is generated by the camera 111 according to the first embodiment of the present application. That is, the screen coordinate system is a coordinate system corresponding to an image 250 which is actually generated by the camera 111.

Example of Synthesis of Pseudo Object Image

Next, an example of the method of synthesizing the pseudo object image will be described.

First, the pseudo object generation section 140 calculates the magnification (a, b), by which the pseudo object image is scaled up or down to the actual size thereof, by using the following expression.

$a = Wo/Wi$ $b = Ho/Hi$

Subsequently, the pseudo object generation section 140 calculates the coordinates (xc, yc, zc) in the camera coordinate system corresponding to the coordinates (x, y) in the pseudo object image through geometric coordinate transformation by using the following expressions.

$$\begin{bmatrix} xtmp \\ ytmp \\ ztmp \end{bmatrix} = \begin{bmatrix} \cos\beta & 0 & \sin\beta \\ 0 & 1 & 0 \\ -\sin\beta & 0 & \cos\beta \end{bmatrix} \begin{bmatrix} a & 0 & 0 \\ 0 & b & 0 \\ 0 & 0 & 0 \end{bmatrix} \begin{bmatrix} x \\ y \\ 1 \end{bmatrix}$$

$$\begin{bmatrix} xw \\ yw \\ zw \end{bmatrix} = \begin{bmatrix} 1 & 0 & 0 & xp \\ 0 & 1 & 0 & 0 \\ 0 & 0 & 1 & zp \end{bmatrix} \begin{bmatrix} xtmp \\ ytmp \\ ztmp \\ 1 \end{bmatrix}$$

$$\begin{bmatrix} xc \\ yc \\ zc \end{bmatrix} = \begin{bmatrix} 1 & 0 & 0 \\ 0 & \cos\alpha & \sin\alpha \\ 0 & -\sin\alpha & \cos\alpha \end{bmatrix} \begin{bmatrix} 1 & 0 & 0 & 0 \\ 0 & 1 & 0 & -h \\ 0 & 0 & 1 & 0 \end{bmatrix} \begin{bmatrix} xw \\ yw \\ zw \\ 1 \end{bmatrix}$$

Subsequently, the pseudo object generation section 140 converts the coordinates (xc, yc, zc) of the camera coordinate system into the coordinates (xs, ys) of the screen coordinate system by using the following expression (perspective projection transform expression).

$$\begin{cases} xs = \dfrac{wimg}{\tan(\theta/2)} \dfrac{xc}{zc} \\ ys = \dfrac{himg}{\tan(\phi/2)} \dfrac{yc}{zc} \end{cases}$$

Thereby, the pixel positions of the original object contour image can be associated with the pixel positions of the camera image. Therefore, the pseudo object generation section 140 calculates the pixel position on the camera image of the portion corresponding to the object within the object contour image, and designates the pixel positions as a pasting position of the pseudo object image. Then, the synthesizing section 150 generates a synthetic image by pasting the provided texture image to the pasting position.

Example of Synthetic Image

FIG. 10 is a diagram illustrating an example of a synthetic image which is synthesized by the synthesizing section 150 according to the first embodiment of the present application. FIG. 10 shows, for example, a synthetic image 260 in which the pseudo object image 261 is synthesized.

It should be noted that the size of the pseudo object image may be automatically changed in accordance with the depth direction of the synthetic image. For example, the pseudo object generation section 140 is able to perform setting so as to decrease the size thereof in accordance with movement to the deep side of the synthetic image in the depth direction.

Example of Detection of Object Next, a method of detecting the object through the detection section 170 will be described. In this example, an example of the detection method in a case of detecting the object entering into the no-entry region will be described. It should be noted that, in this example, for convenience of description, the no-entry region is formed in a rectangular shape.

The detection section 170 stores an image (background image) in which the object as the detection target is not included. Here, the background image means an image, which corresponds to the image capturing range for the monitoring target, and an image in which the entered object (for example, intruder) is not present. The background image is, for example, an image 200 shown in FIG. 2A.

Further, the detection parameter setting section 160 designates the upper left coordinates and the lower right coordinates of the rectangle corresponding to the no-entry region in the background image. The designation is performed on the basis of, for example, the detection parameter which is set by the user's operation.

Subsequently, the detection section 170 calculates the absolute value of the difference in luminance between the synthetic image, which is generated by the synthesizing section 150, and the background image, which is stored, for each pixel. Subsequently, the detection section 170 extracts a pixel at which the calculated absolute value of the difference in luminance is large relative to the threshold value as a reference value (for example, a pixel at which the absolute value of the difference is equal to or greater than the threshold value). As described above, it can be determined that the pixel, at which the calculated absolute value of the difference in luminance is large relative to the threshold value as a reference value, is the pixel corresponding to the object as the detection target.

Subsequently, the detection section 170 groups adjacent pixels among the extracted pixels, and sets the region of the pixel group as the object region. Subsequently, the detection section 170 calculates a barycenter of the object region. For example, the detection section 170 calculates the average coordinates of the sets of the coordinates (x, y) of the respective pixels within the object region, thereby being able to calculate the coordinates corresponding to the average value, as the barycenter of the object region.

Subsequently, the detection section 170 determines whether or not the barycenter of the object region is included in the rectangle corresponding to the no-entry region, and determines whether or not the object corresponding to the object region has entered into the no-entry region on the basis of the determination result. For example, the x coordinate of the barycenter of the object region may be present between the left end coordinates and the right end coordinates of the rectangle corresponding to the no-entry region. In addition, the y coordinate of the barycenter of the object region may be present between the upper end coordinates and the lower end coordinates of the rectangle. In this case, the detection section 170 determines that the object has entered into the no-entry region. In contrast, the x coordinate of the barycenter of the object region may not be present between the left end coordinates and the right end coordinates of the rectangle. Alternatively, the y coordinate of the barycenter of the object region may not be present between the upper end coordinates and the lower end coordinates of the rectangle. In this case, the detection section 170 determines that the object has not entered into the no-entry region.

In addition, in a case other than the case of using the rectangle corresponding to the no-entry region, it is also possible to detect the object in the same manner. For example, when the object entering into the no-entry region 201 shown in FIG. 2B is detected, the coordinates for specifying the no-entry region 201 are designated, and it is determined whether or not the barycenter of the object region is included in the no-entry region 201. Then, on the basis of the determination result, it is possible to determine whether or not the object corresponding to the object region has entered into the no-entry region 201.

As described above, in the case of performing the detection process of detecting the object entering into the no-entry region, the detection result is displayed on the display section 180. For example, in the case of detecting the object entering into the no-entry region, the display information for specifying the object is displayed on the display section 180. For example, as shown in FIG. 2C, the detected person can be displayed on the display section 180 in a state where the frame (display information) 211 is applied to the detected person. Further, the detection result may be output as sound output.

In addition, under a condition in which a constant time period has passed after the object enters into the no-entry region (that is, the object stays in the no-entry region for a constant time period or more), it may be determined that the object enters into the no-entry region.

When detecting the object that moves (passes through the registered path) in the registered path (for example, the no-entry path), the detection section 170 determines whether or not the barycenter of the object region coincides (or substantially coincides) with the coordinates of the segment corresponding to the registered path. Then, the detection section 170 is able to determine whether or not the object corresponding to the object region moves in the registered path on the basis of the determination result.

When detecting whether the object is left behind, the detection section 170 determines whether or not the time period that has passed after the object region became present is equal to or greater than a threshold value. Then, the detection section 170 determines whether or not the object is left behind, on the basis of the determination result.

When detecting whether the registered object (for example, the object not to be carried out) is carried out, the detection section 170 determines whether or not the time period during which the registered object is not present at the registration position (for example, the installation location of the registered object) is equal to or greater than a threshold value. Then, the detection section 170 is able to determine whether or not the registered object is carried out, on the basis of the determination result.

Example of Adjustment of Detection Parameter

Figure 11A:
FIGS. 11A and 11B are diagrams illustrating examples of adjustment of the detection parameter performed by the detection parameter setting section according to the first embodiment of the present application.
Figure 11B:
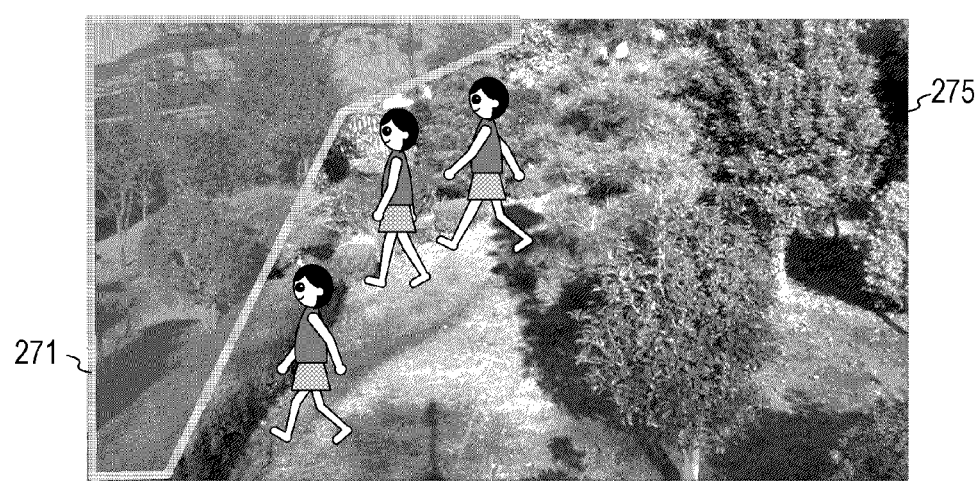

FIGS. 11A and 11B are diagrams illustrating examples of adjustment of the detection parameter performed by the detection parameter setting section 160 according to the first embodiment of the present application.

FIG. 11A shows a no-entry region 271 which is subjected to the adjustment for narrowing the no-entry region 201 shown in FIG. 2B.

FIG. 11B shows an example of an image in the case where the no-entry region 271 is set.

Here, a user may not obtain a desired detection result. For example, in the state shown in FIG. 2C, although a person is not actually entering into the no-entry region 201, it may be determined that the person has entered into the no-entry region 201. As described above, when the user does not obtain the desired detection result, referring to the detection result, the user sets the detection parameter again.

For example, by adjusting the detection parameter, it is possible to change the size of the no-entry region. For example, as shown in FIG. 11A, by performing the adjustment for narrowing the no-entry region 201 shown in FIG. 2B, the no-entry region 271 is set. As described above, by setting the no-entry region 271, for example, as shown in FIG. 11B, it is possible to reduce false detection for the person who has not entered into the no-entry region 271. That is, it is possible to improve an accuracy in detection.

When a user obtains the desired detection result, all the processes are repeated using other pseudo object images, other textures, and the like. By using various pseudo object images, the processes are repeated until a correct detection result is obtained. Thereby, it is possible to set a detection parameter with high robustness.

In addition, the above-mentioned detection method (the method of detecting the object by using the value of the difference between the synthetic image and the background image) is just an example, and another detection method may be used. For example, it is possible to use a detection method of detecting the object by using a feature amount other than the synthetic image and the background image. For example, it is possible to use the following methods: a detection method of detecting the object by using the difference in the pixel feature such as an edge amount other than simple pixel value difference; a detection method of detecting the object by using the degree of similarity in the histogram of a small region; and a detection method of detecting an object by using the degree of similarity in the edge direction. Further, it is possible to use not only a detection method of detecting the object on the basis of a result of comparison between the synthetic image and the background image, but also a detection method of detecting the object on the basis of a result of comparison between the synthetic image and a template image (or a template feature amount) which is provided in advance.

Further, by using another detection method, an object (for example, an airplane, a vehicle, and a human body) may be detected. For example, it is possible to use a detection method of detecting the object (for example, refer to Japanese Unexamined Patent Application Publication No. 2010-067102) by using histograms of oriented gradients (HOG).

Example of Operation of Image Processing Apparatus

Figure 12:
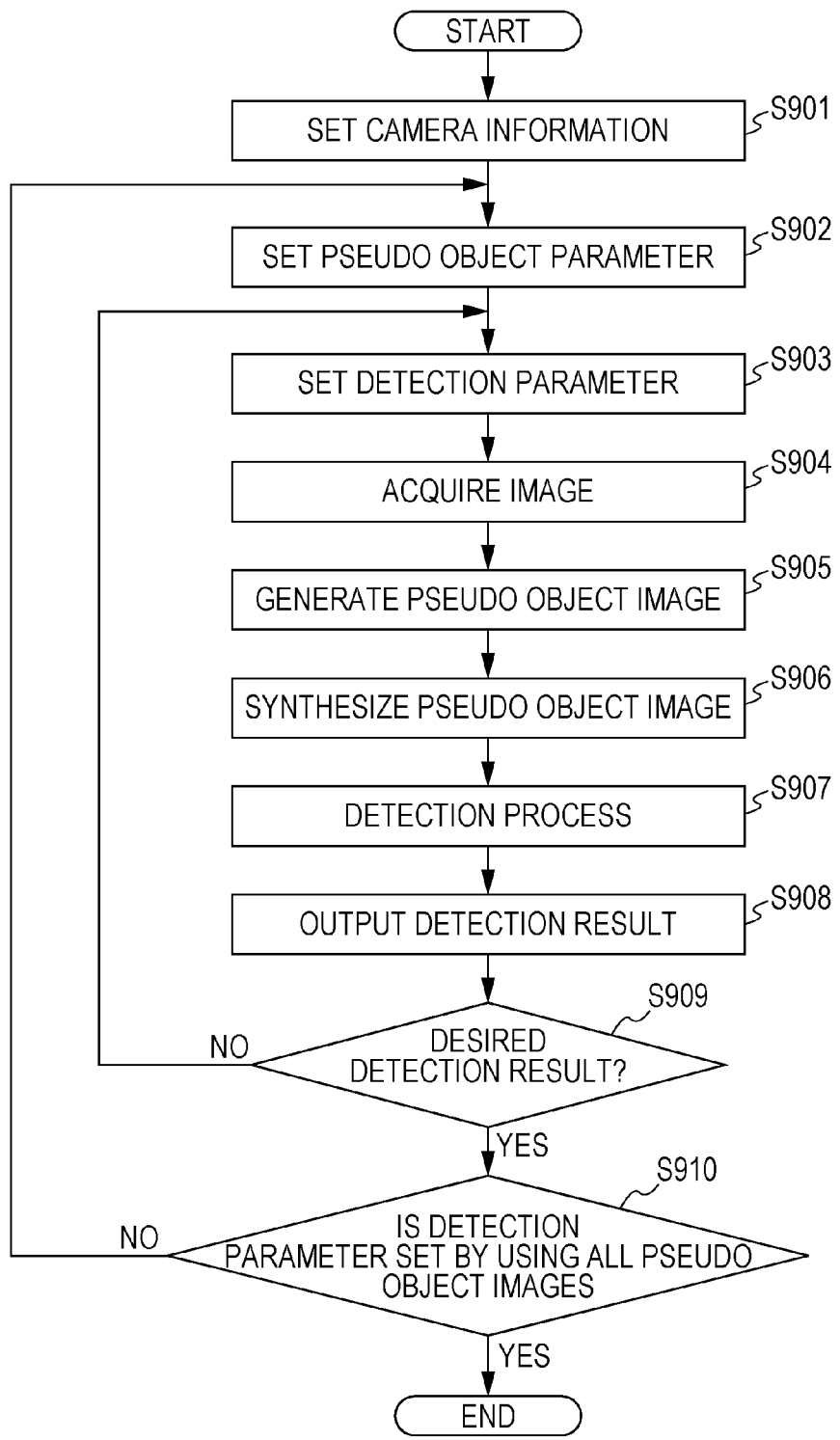
FIG. 12 is a flowchart illustrating an example of a procedure of a detection parameter setting process performed by the image processing apparatus according to the first embodiment of the present application.

FIG. 12 is a flowchart illustrating an example of a procedure of a detection parameter setting process performed by the image processing apparatus 100 according to the first embodiment of the present application.

First, in the image processing apparatus 100, camera information is set (step S901). For example, an installation position of the camera, an angle of view of the camera, and a size of an image generated by the camera are set (step S901). Subsequently, the pseudo object setting section 130 sets the pseudo object parameter on the basis of the user's operation (step S902). It should be noted that step S902 is an example of a step of object setting described in claims.

Subsequently, the detection parameter setting section 160 sets the detection parameter used in the detection process performed by the detection section 170, on the basis of the user's operation (step S903). For example, the no-entry region is set by the detection parameter. Further, a message for showing a detection result (for example, alarm activation) to the effect that the object has entered into the no-entry region is set.

Subsequently, the image capturing section 110 generates an image by capturing the image of the subject included in the image capturing range for the monitoring target (step S904). Subsequently, the pseudo object generation section 140 generates a pseudo object image on the basis of the pseudo object parameter which is set by the pseudo object setting section 130 (step S905).

Subsequently, the synthesizing section 150 synthesizes the image, which is generated by the image capturing section 110, with the pseudo object image, which is generated by the pseudo object generation section 140, so as to generate a synthetic image (step S906). Subsequently, the detection section 170 performs the detection process on the synthetic image, on the basis of the detection parameter which is set by the detection parameter setting section 160 (step S907).

It should be noted that step S907 is an example of a step of detection described in claims.

Subsequently, the display section 180 displays the detection result of the detection process performed by the detection section 170 (step S908). It should be noted that step S908 is an example of an output step described in claims.

Subsequently, it is determined whether or not the detection result desired by a user is obtained (step S909). For example, a user visually checks the detection result which is displayed on the display section 180, and thereby determines whether or not the desired detection result is obtained. Then, if there is a user's operation to the effect that the desired detection result is not obtained (step S909), the procedure returns to step S903.

Further, if there is a user's operation to the effect that the desired detection result is obtained (step S909), it is determined whether or not the detection parameter is set by using all the pseudo object images (step S910). For example, it is determined whether or not the detection parameter is set by using all the pseudo object images conceivable by the user. Then, if there is a user's operation to the effect that the detection parameter using all the pseudo object images conceivable by the user is not set (step S910), the procedure returns to step S902. In contrast, if there is a user's operation to the effect that the detection parameter using all the pseudo object images conceivable by the user is set (step S910), the operation of the detection parameter setting process ends.

As described above, in the example of the first embodiment of the present application, the human body is modeled as a rectangular plate by using a two-dimensional object contour image. Here, by using a three-dimensional human body model and pasting the texture images to the model, it is possible to perform three-dimensional modeling. For example, each of a rectangular parallelepiped body, rectangular parallelepiped hands and legs, and a cubic head is modeled. Then, while converting each surface of each figure into coordinates on screen in the above-mentioned method, by pasting the texture image in a similar manner, it is possible to obtain the synthetic image.

2. Second Embodiment

In the example of the first embodiment of the present application, the pseudo object image is generated by using the object contour image and the texture image. Here, for example, an image to be used as the pseudo object image may be captured by the image capturing device such that the pseudo object image is generated in advance.

Accordingly, in an example of a second embodiment of the present application, the image to be used as the pseudo object image is captured by the image capturing device such that the pseudo object image is generated in advance. It should be noted that the image processing apparatus according to the second embodiment of the present application has elements common to the image processing apparatus 100 (shown in FIG. 1) according to the first embodiment of the present application. Hence, the elements common to the image processing apparatus 100 are represented by the same reference numerals and signs, and the description will be partially omitted.

Example of Generation of Pseudo Object Image

Figure 13:
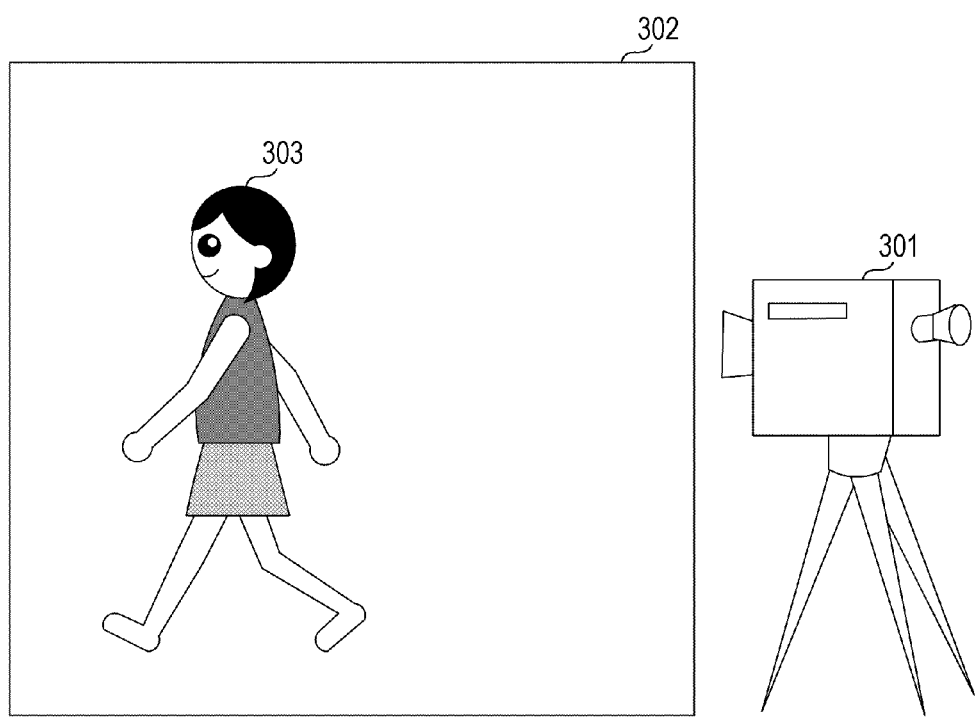
FIG. 13 is a diagram illustrating an example of generation of a pseudo object image used in synthesis performed by the synthesizing section according to a second embodiment of the present application.

FIG. 13 is a diagram illustrating an example of generation of a pseudo object image used in synthesis performed by the synthesizing section 150 according to a second embodiment of the present application.

For example, an object (for example, a person) 303 corresponding to the pseudo object image is placed in front of a single color background 302. Then, the object 303 moves to correspond to various pseudo object images. The object 303, which moves in such a manner, is photographed as a moving image by an image capturing device (for example, a digital still camera or a digital video camera) 301. Then, a portion corresponding to the object is cut out from each of frames constituting the moving image which is photographed in such a manner, thereby generating the pseudo object images (time-series object patch images).

Figure 14:
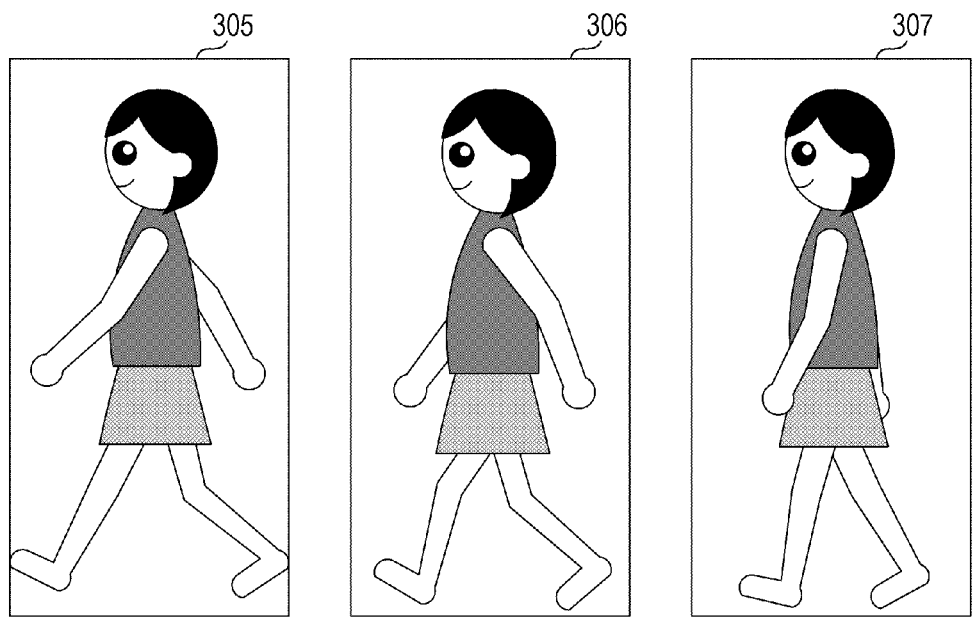
FIG. 14 is a diagram illustrating an example of pseudo object images used in synthesis performed by the synthesizing section according to the second embodiment of the present application.

For example, it is desirable that a plurality of persons be collected as the objects, each person get dressed in one of various outfits, and the person be photographed as a moving image while various movements (for example, walking and running in the path) are tried. FIG. 14 shows an example of the pseudo object images generated in such a manner.

Example of Pseudo Object Image

FIG. 14 is a diagram illustrating an example of the pseudo object images used in synthesis performed by the synthesizing section 150 according to the second embodiment of the present application.

FIG. 14 shows pseudo object images 305 to 307 which are generated by the method shown in FIG. 13. In addition, in FIG. 14, only three pseudo object images 305 to 307 are shown as the pseudo object images, and other pseudo object images are omitted. Further, the pseudo object images 305 to 307 are used in a state where the images are stored by the pseudo object generation section 140.

Example of Setting of Start Position and End Position

Figure 15:
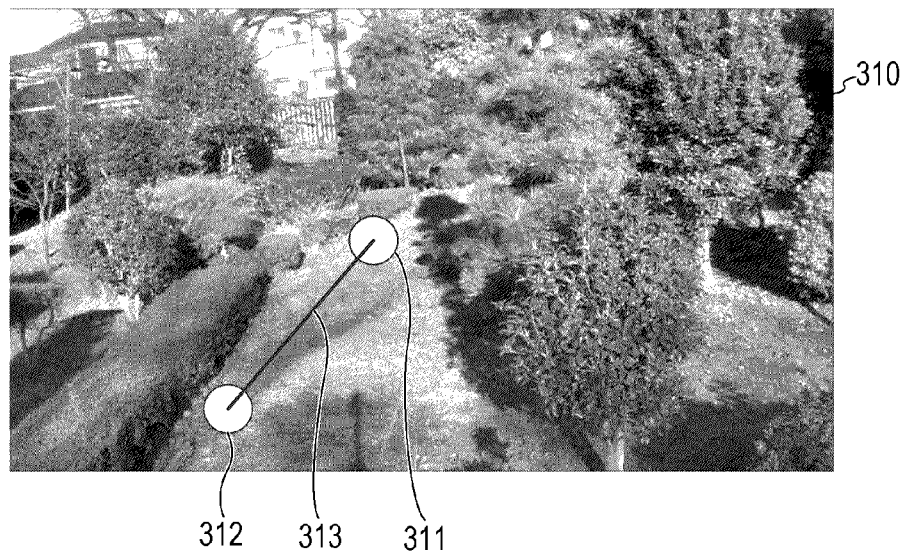
FIG. 15 is a diagram illustrating an example of setting of a start position and an end position performed by the pseudo object setting section according to the second embodiment of the present application.

FIG. 15 is a diagram illustrating an example of setting of the start position and the end position performed by the pseudo object setting section 130 according to the second embodiment of the present application.

FIG. 15 shows a start position (start coordinates) 311, an end position (end coordinates) 312, and a path 313 which is specified by the start position 311 and the end position 312, in an image 310. In addition, FIG. 15 shows the path 313 of the line which is specified by the start position 311 and the end position 312, as the path for moving the pseudo object image (the path in which the pseudo object image is intended to be placed). Here, the path for moving the pseudo object image may be appropriately changed in accordance with the no-entry region. For example, in a case of a no-entry region of which the outer periphery is circular, the space between the start position and the end position can be set as a curved path along the circle.

That is, the pseudo object setting section 130 sets the appearance and movement of the object (for example, a person) which is placed in the image generated by the image capturing section 110. Then, the detection section 170 performs the detection process on a plurality of synthetic images in which the pseudo object images specified by the appearance and movement of the set object are synthesized. For example, the pseudo object setting section 130 sets the path, in which the pseudo object image is intended to be placed, on the image generated by the image capturing section 110. In this case, the detection section 170 performs the detection process on the plurality of synthetic images in which the pseudo object images are synthesized in the path.

Further, for example, the pseudo object setting section 130 may set a plurality of positions, to which the pseudo object images are intended to be moved, in the image generated by the image capturing section 110. In this case, the detection section 170 performs the detection process on the plurality of synthetic images in which the pseudo object images are synthesized respectively at the plurality of positions. For example, in the path which is set on the image generated by the image capturing section 110, a plurality of positions, at which the pseudo object image is intended to be placed, may be set. Thereby, it is possible to perform the detection process on the plurality of synthetic images in which the pseudo object images are synthesized respectively at the plurality of positions.

Example of Operation of Image Processing Apparatus

Figure 16:
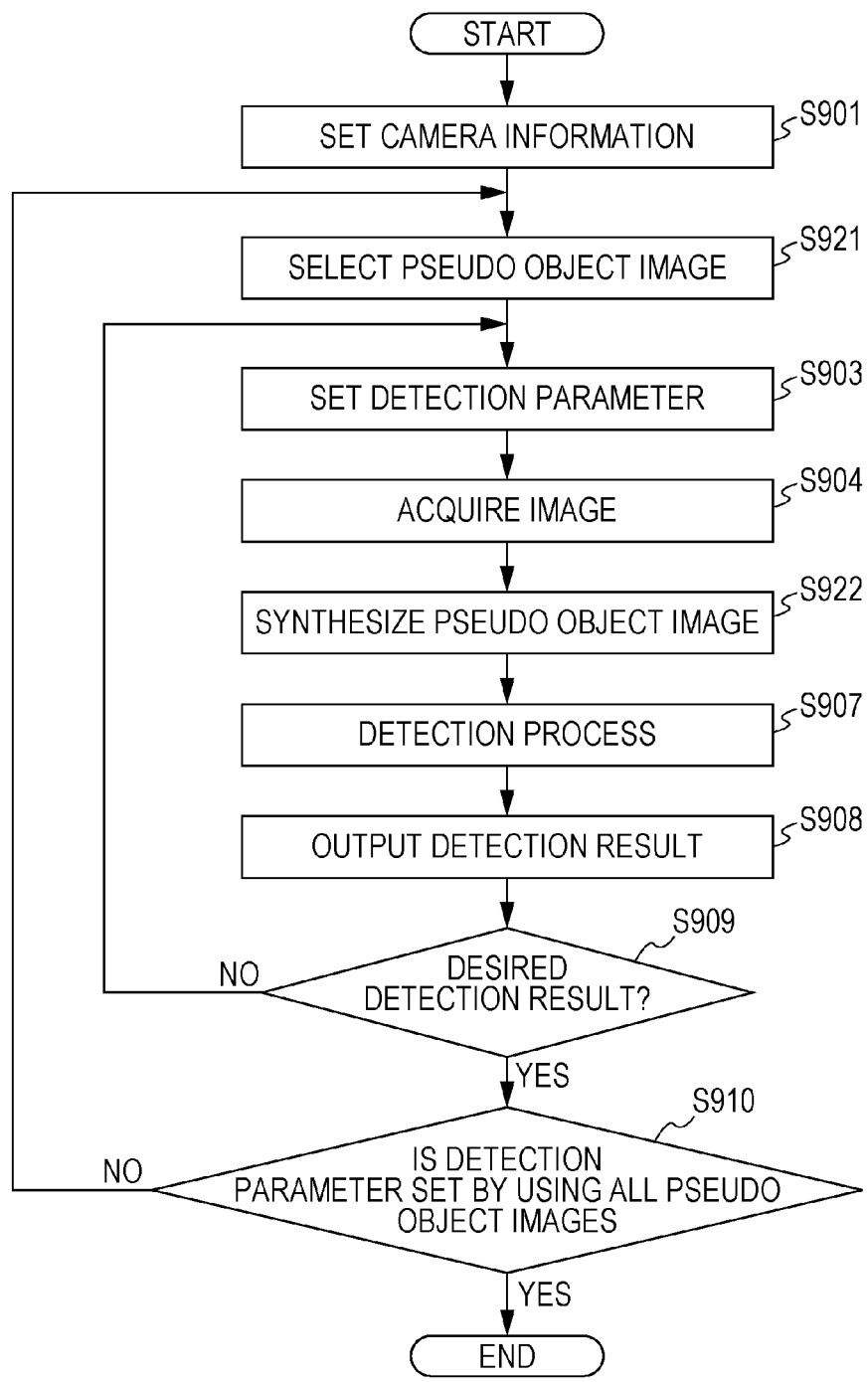
FIG. 16 is a flowchart illustrating an example of a procedure of a detection parameter setting process performed by the image processing apparatus according to the second embodiment of the present application.

FIG. 16 is a flowchart illustrating an example of a procedure of the detection parameter setting process performed by the image processing apparatus 100 according to the second embodiment of the present application. It should be noted that the procedure is the modification of a part of the procedure shown in FIG. 12. Hence, the portions corresponding to the procedure shown in FIG. 12 are represented by the same reference numerals and signs, and the description thereof will be partially omitted.

The pseudo object setting section 130 sets the pseudo object on the basis of the user's operation (step S921). For example, the pseudo object setting section 130 selects attributes (for example, a gender, and an age) of the object, movement types, outfits, and the like, from time-series object patch images, which are provided in advance, on the basis of the user's operation. Further, for example, the pseudo object setting section 130 sets the start position (the start coordinates) and the end position (the end coordinates) as positions from and to which the pseudo object image moves on the real image. FIG. 15 shows an example of the setting. Further, for example, the pseudo object setting section 130 sets a moving speed of the pseudo object image in the movement path from the start position to the end position. Through the setting described above, complex movement can be made by connecting a plurality of movements. Further, for example, the pseudo object setting section 130 also sets the size (width and height) of the pseudo object. Furthermore, here, in order to synthesize the pseudo object image with the image generated by the image capturing section 110, the selected time-series object patch image is resized to a designated size.

The synthesizing section 150 synthesizes the pseudo object image, which is selected by the pseudo object generation section 140, with the image generated by the image capturing section 110, thereby generating a synthetic image (step S922). For example, the synthesizing section 150 superposes a first image (pseudo object image) in the selected object patch image sequence upon the image generated by the image capturing section 110 at the start position which is set by the pseudo object setting section 130. For example, the synthesizing section 150 generates the synthetic image by using pixel values of either one of the object patch image and the image, which is generated by the image capturing section 110, in the portion where the object patch image is superposed upon the image generated by the image capturing section 110. For example, if the color of the pixels within the object patch image is the same as the color of the background used at the time of photographing the object patch image, the synthesizing section 150 selects pixel values of the image generated by the image capturing section 110. In contrast, if the color of pixels is not the same as the color of the background, the synthesizing section 150 selects pixel values of the object patch image.

The synthesizing section 150 sets a position (the subsequent coordinates) for movement at the set speed along the path which is set by the pseudo object setting section 130. Then, the synthesizing section 150 superposes a second image (pseudo object image) in the selected object patch image sequence upon the image generated by the image capturing section 110 at the position (the subsequent coordinates). Further, third and following images (pseudo object images) in the object patch image sequence are also superposed thereupon in a similar manner. That is, each synthesizing process is repeated until the end coordinates are reached. Further, if there is a plurality of paths, the process is repeated according to the number of paths. As described above, the detection section 170 performs the detection process on each of the synthetic images which are sequentially generated (step S907).

3. Third Embodiment

In the examples of the first and second embodiments of the present application, a user views the detection result of the detection process performed by the detection section 170, and the user manually sets the detection parameter. The detection parameter can also be automatically set.

Accordingly, the third embodiment of the present application describes an example in which the detection parameter is automatically set.

Configuration Example of Image Processing Apparatus

Figure 17:
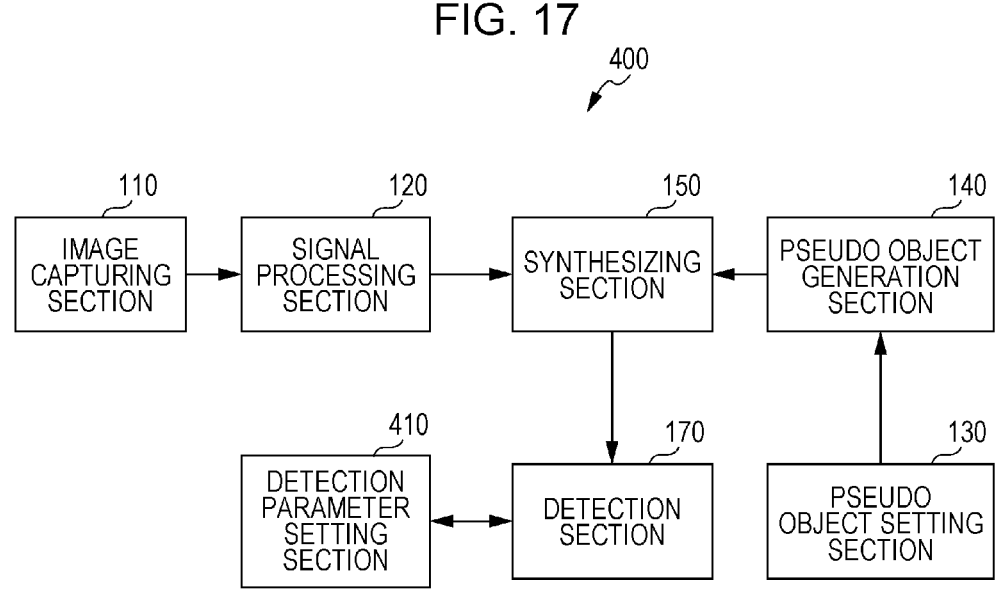
FIG. 17 is a block diagram illustrating a functional configuration example of an image processing apparatus according to a third embodiment of the present application.

FIG. 17 is a block diagram illustrating a functional configuration example of an image processing apparatus 400 according to a third embodiment of the present application. In addition, the image processing apparatus 400 is partially changed from the image processing apparatus 100 (shown in FIG. 1) according to the first embodiment of the present application. Hence, the elements common to the image processing apparatus 100 are represented by the same reference numerals and signs, and the description will be partially omitted.

The image processing apparatus 400 includes a detection parameter setting section 410.

The detection parameter setting section 410 performs the setting by automatically calculating the detection parameter on the basis of the detection result of the detection process performed by the detection section 170.

For example, it is conceivable that, in a situation where a certain scene shows both of the branches of a tree swaying in the wind and the object serving as the detection target, only the object is detected without false detection of the swaying of the branches. For example, the swaying of the tree is not detected when the sensitivity of the detection process is set to be low. However, there is a concern that the object serving as the detection target is also not detected when the sensitivity is set to be excessively low.

Here, the position of the pseudo object image in the synthetic image can be acquired in advance through calculation of coordinates. Hence, it can be automatically determined whether the obtained detection result indicates detection of the object of the pseudo object image or false detection of the swaying of the branches of the tree.

Therefore, the synthesizing section 150 outputs the position of the pseudo object image in the synthetic image to the detection section 170 together with the synthetic image. Further, the detection section 170 outputs the position of the pseudo object image in the synthetic image to the detection parameter setting section 410 and stores the position.

As described above, by storing the position of the pseudo object image in the synthetic image, the detection parameter setting section 410 determines whether or not the detection result of the detection process performed by the detection section 170 includes false detection, on the basis of the position of the pseudo object image in the synthetic image. For example, if the detection result of the detection process performed by the detection section 170 includes false detection, the detection parameter setting section 410 sets a low detection sensitivity. Then, the detection section 170 performs the detection process once again, on the basis of the setting contents (the detection sensitivity is set to be slightly low). As described above, by automatically repeating the process of resetting the detection sensitivity and the detection process until the false detection is not performed, it is possible to obtain the final optimum detection parameter.

It should be noted that selection of the pseudo object can also be automatically set. For example, it is possible to sequentially select objects of an object set including various types of object, objects with various movements, and objects with various poses. Further, it is also possible to adopt a setting method in which a user sets only the movement of the object and the size of the object and only the texture of the object is randomly changed. Thereby, it is not necessary for the user to select the pseudo objects one by one, and it is possible to automatically select the pseudo objects.

4. Fourth Embodiment

The first to third embodiments of the present application described, as examples, the image processing apparatuses 100 and 400 which are integrally formed. Here, the first to third embodiments of the present application can be applied to an image processing system of which the respective functions of the image processing apparatuses 100 and 400 are implemented by a plurality of devices.

Accordingly, a fourth embodiment of the present application describes an example of the image processing system formed of the plurality of devices. In addition, the respective sections constituting the image processing system according to the fourth embodiment of the present application correspond to the respective sections constituting the image processing apparatus 100 shown in FIG. 1. Hence, the effects of the portions corresponding to the image processing apparatus 100 will be described, and the description thereof will be partially omitted. Further, the image processing system corresponding to the image processing apparatus 400 shown in FIG. 17 are not shown in the drawings, and the description thereof will be omitted, but the present application can be applied in the same manner.

Configuration Example of Image Processing System

Figure 18:
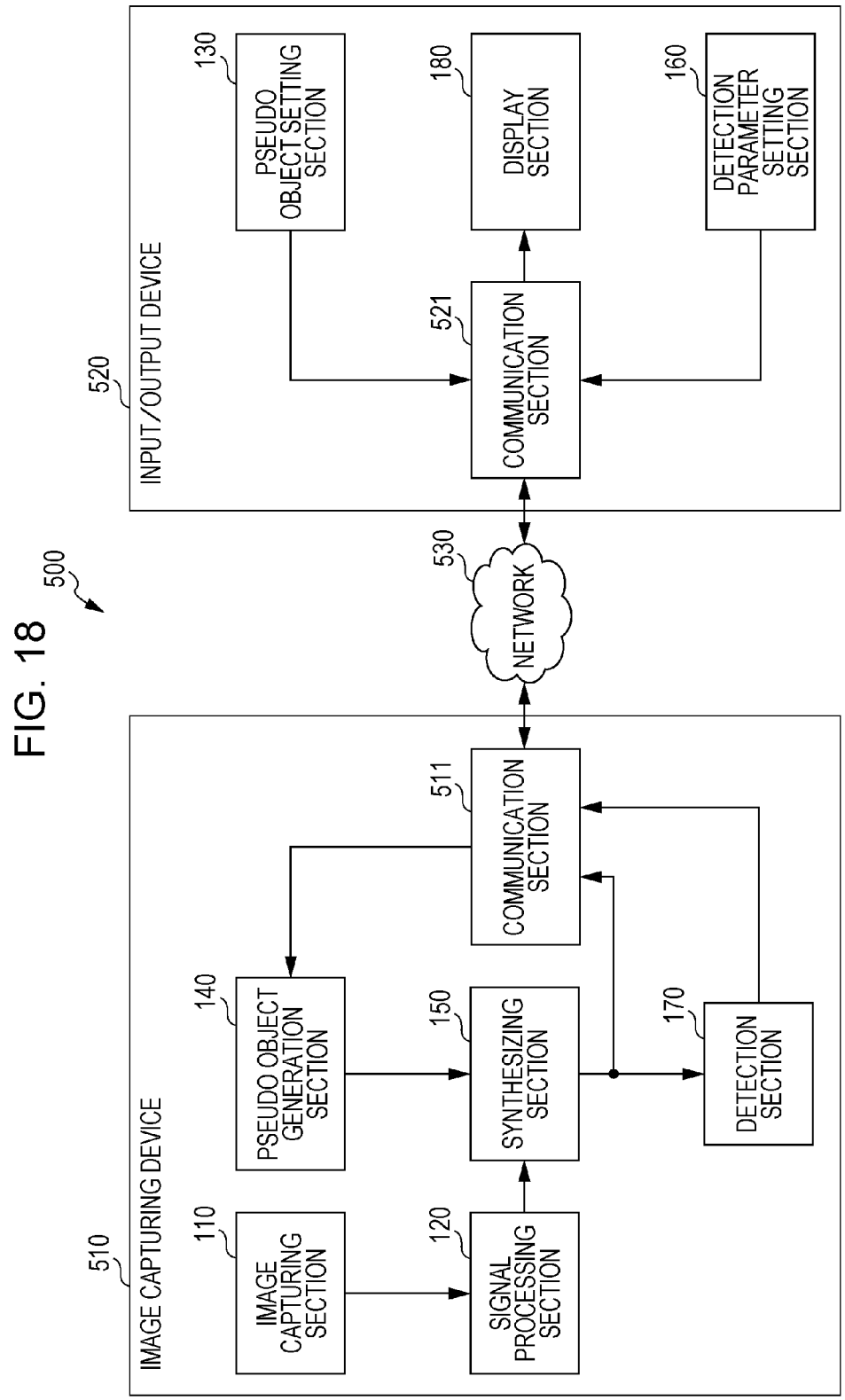
FIG. 18 is a diagram illustrating a configuration example of an image processing system according to a fourth embodiment of the present application.

FIG. 18 is a diagram illustrating a configuration example of an image processing system 500 according to the fourth embodiment of the present application.

The image processing system 500 includes an image capturing device 510, an input/output device 520, and a network 530.

The network 530 is a network that connects the image capturing device 510 and the input/output device 520. For example, the network 530 is a network (for example, public line network) such as a telephone network and the Internet. Further, for example, the network 530 may be formed of a wired network (for example, Ethernet (registered trademark)) or a coaxial cable.

The image capturing device 510 includes the image capturing section 110, the signal processing section 120, the pseudo object generation section 140, the synthesizing section 150, the detection section 170, and a communication section 511.

The input/output device 520 includes the pseudo object setting section 130, the detection parameter setting section 160, the display section 180, and a communication section 521. Further, the input/output device 520 is, for example, a terminal for checking the detection result obtained by the image capturing device 510 and for performing control thereof.

The communication section 511 is connected to the network 530 so as to communicate with the input/output device 520 through the network 530. For example, the communication section 511 transmits information, which is output from the synthesizing section 150 and the detection section 170, to the input/output device 520 through the network 530. Further, the communication section 511 outputs the information, which is received from the input/output device 520 through the network 530, to the pseudo object generation section 140.

The communication section 521 is connected to the network 530 so as to communicate with the image capturing device 510 through the network 530. For example, the communication section 521 transmits information, which is output from the pseudo object setting section 130 and the detection parameter setting section 160, to the image capturing device 510 through the network 530. Further, the communication section 521 outputs the information, which is received from the image capturing device 510 through the network 530, to the display section 180.

It should be noted that the image processing system 500 shown in FIG. 18 is just an example and may have another configuration. For example, the respective sections other than the image capturing section 110, the display section 180, pseudo object setting section 130, and the detection parameter setting section 160 can be disposed on either one of the image capturing device 510 or the input/output device 520.

Configuration Example of Image Processing System

Figure 19:
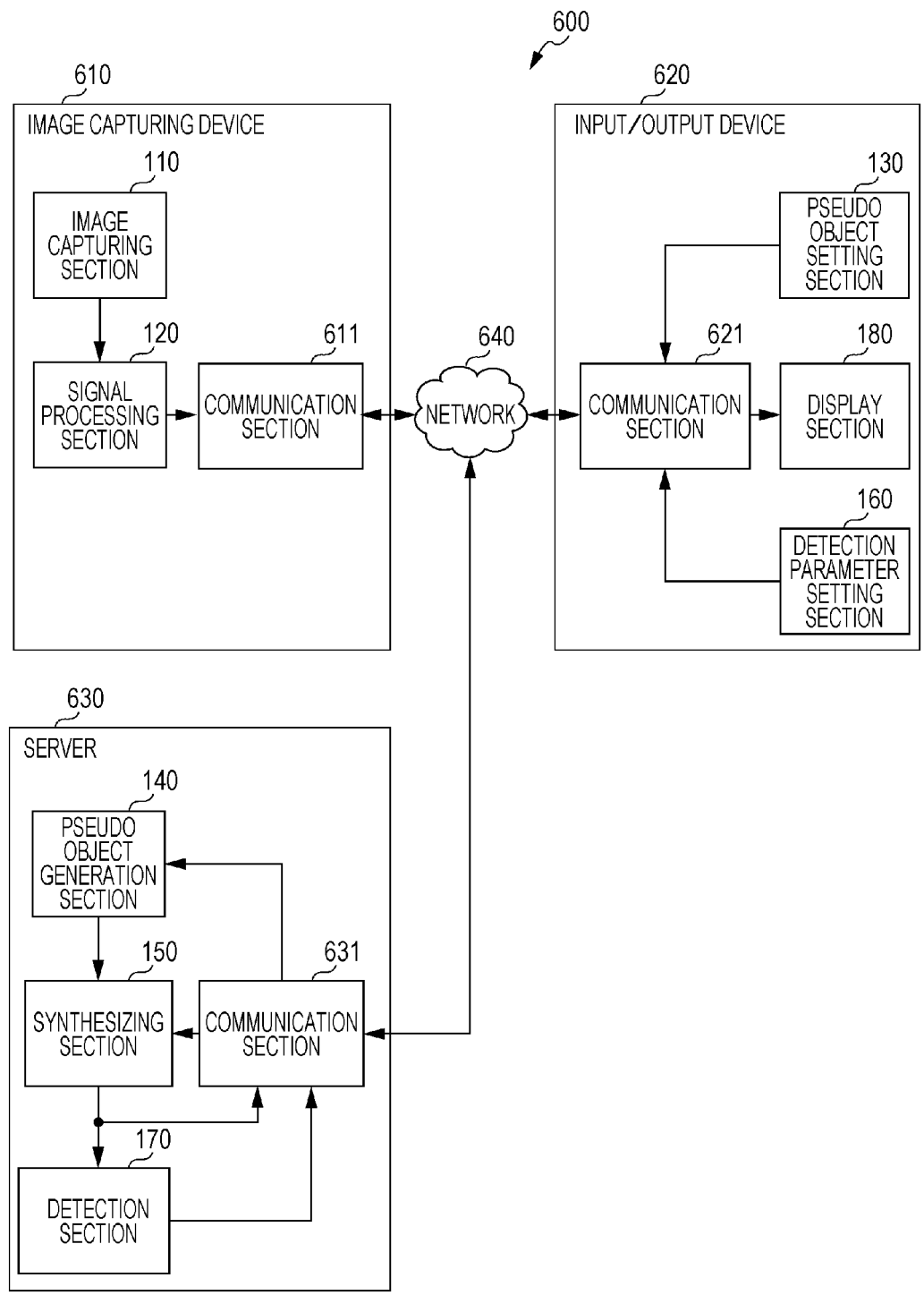
FIG. 19 is a diagram illustrating a configuration example of an image processing system according to the fourth embodiment of the present application.

FIG. 19 is a diagram illustrating a configuration example of an image processing system 600 according to the fourth embodiment of the present application.

The image processing system 600 includes an image capturing device 610, an input/output device 620, a server 630, and a network 640.

It should be noted that the network 640 corresponds to the network 530 shown in FIG. 18.

The image capturing device 610 includes the image capturing section 110, the signal processing section 120, and a communication section 611. It should be noted that the communication section 611 corresponds to the communication section 511 shown in FIG. 18.

The input/output device 620 includes the pseudo object setting section 130, the detection parameter setting section 160, the display section 180, and a communication section 621. It should be noted that the input/output device 620 corresponds to the input/output device 520 shown in FIG. 18. That is, the input/output device 620 is, for example, a terminal for checking the detection result obtained by the server 630 and for performing control thereof.

The server 630 includes the pseudo object generation section 140, the synthesizing section 150, the detection section 170, and a communication section 631. Further, the server 630 is, for example, an image analysis server that detects the desired event by acquiring an image, which is output from the image capturing device 610, and analyzing the image.

The communication section 631 is connected to the network 640 so as to communicate with the image capturing device 610 and the input/output device 520 through the network 640. For example, the communication section 631 transmits the information, which is output from the synthesizing section 150 and the detection section 170, to the input/output device 620 through the network 640. Further, the communication section 631 outputs the information, which is received from the image capturing device 610 through the network 640, to the synthesizing section 150.

Furthermore, the communication section 631 outputs the information, which is received from the input/output device 620 through the network 640, to the pseudo object generation section 140.

It should be noted that the image processing system 600 shown in FIG. 19 is just an example and may have another configuration. For example, the respective sections other than the image capturing section 110, the display section 180, the pseudo object setting section 130, and the detection parameter setting section 160 can be disposed on any one of the image capturing device 610, the input/output device 620, and the server 630.

Here, for example, the situation of the region, which is monitored by the surveillance camera, becomes different in accordance with day and night and whether, and changes every day in accordance with growth of grass. Hence, in the system in which the surveillance camera performs the detection process, it is difficult to correctly set the detection parameter. Hence, in the related art, for example, mostly, it is actually checked whether the detection process correctly operates by reproducing the event (for example, the entry of the person into the no-entry region) to be actually subjected to the monitoring at the location where the surveillance camera is provided. That is, the detection parameter has to be set such that various changes in environment and various movements of the objects are correctly detected. Hence, unless the detection parameter is set over and over again in the field under various conditions, it is difficult to obtain the detection parameter appropriate to precisely execute the detection process.

For example, in recent years, as internet protocol (IP) surveillance cameras have come into widespread use, the installation locations of the surveillance cameras can be connected to a terminal, which is actually monitored by an observer, through a network, whereby it is possible to monitor a larger area. However, as the monitoring area becomes larger, higher costs become necessary to send the observer to the installation locations of the surveillance cameras. Further, though the surveillance camera condition can be checked in the field, the setting of the camera itself is performed by the terminal. Hence, it is necessary for at least two people to perform the setting separately on the field side and on the terminal side, and thus the costs are extremely high.

In the related art, when the detection parameter of the surveillance camera is set, it is necessary for a person to perform various movements in the field in order to perform optimum setting in which various movements and various outfits of the object are considered. Thus, it is difficult to perform precise detection without enormous efforts.

Further, due to the effect of growth of grass or the change in the length of the day according to the season, it is necessary to change the setting of the detection parameter. However, it is preferable to minimize the costs for a single setting operation.

As described above, in the related art, a person tries to perform various movements in the field, whereby it is checked whether the detection parameter is appropriate.

In contrast, in the embodiment of the present application, it is possible to set the detection parameter used in the detection process without sending a person into the field. Thereby, while keeping detection precision high, the efforts therefor are reduced, and thus it is possible to significantly reduce the labor costs. Further, without using the image of the object actually captured by the surveillance camera, the pseudo object image is virtually generated, and synthesized with the camera image. Hence, on the basis of the synthetic image in which the objects with necessary and sufficient various movements appear, it is possible to appropriately adjust the detection parameter. Furthermore, it is possible to easily perform the setting of the surveillance camera using the synthetic image.

In addition, the embodiments of the present application described, as an example, the image processing apparatus that fixes the image capturing range for the monitoring target. However, for example, the embodiments of the present application can also be applied to an image processing apparatus (for example, a pan surveillance camera that pans in the horizontal direction) capable of moving the image capturing range for the monitoring target. For example, the pan angle (for example, the angle of the optical axis in the horizontal direction) and information pieces (for example, the background image information, the detection parameter, and the pseudo object parameter) are stored in association with each other. Then, when the detection process is performed, the detection process is performed by using the information pieces stored in association with the corresponding pan angle at the time of the detection process.

In addition, the above-mentioned embodiments are just examples for implementing the present application, and the items of the embodiments respectively correspond to the specific technical items of the claims. Likewise, the specific technical items of the claims respectively correspond to the items of the embodiments of the present application which are represented by the same numerals and signs. However, the present application is not limited to the embodiments, and the embodiments may be modified into various forms without departing from the scope of the present application.

The procedure described in the above-mentioned embodiments may be understood as a method having a series of steps, and may be understood as a program for causing a computer to execute the series of steps and a recording medium storing the program. As the recording medium, for example, it is possible to use a compact disc (CD), a mini disc (MD), a digital versatile disc (DVD), a memory card, a Blu-ray (registered trademark) disc, and the like.

It should be noted that the present application may have the following configurations.

(1) An image processing apparatus including:

an object setting section that sets an object image indicating an object which is placed in an image generated by an image capturing section;

a detection section that detects the object included in a synthetic image in which the object image and the image generated by the image capturing section are synthesized; and an output section that outputs output information for setting a detection parameter used in a detection process performed by the detection section, that is, output information in which the synthetic image and a detection result of the detection process are associated.

(2) The image processing apparatus according to (1), in which the detection parameter is at least one of a parameter for setting a detection rule used when the detection process is performed and a parameter for adjusting a detection sensitivity of the detection process, and in which the detection section performs the detection process by using the set detection parameter.

(3) The image processing apparatus according to (1) or (2), in which the detection parameter is a parameter for detecting predetermined movement of the object included in the synthetic image, and in which the detection section detects whether or not the object included in the synthetic image performs the predetermined movement.

(4) The image processing apparatus according to (3), in which the detection parameter is a parameter for specifying a registered region of the image generated by the image capturing section, and in which the detection section detects whether or not the object included in the synthetic image enters into the registered region.

(5) The image processing apparatus according to (4), in which the output section displays notification information, which is for notifying that the object enters into the registered region, over the synthetic image.

(6) The image processing apparatus according to any one of (1) to (5), in which the output section outputs notification information, which is for notifying that the object is detected from the synthetic image, in a state where the notification information is included in the output information.

(7) The image processing apparatus according to any one of (1) to (6), in which the object setting section sets appearance and movement of the object which is placed in the image generated by the image capturing section, and in which the detection section performs the detection process on the synthetic image in which the object image specified by the set appearance and movement of the object is synthesized.

(8) The image processing apparatus according to (7), in which the object setting section sets a path in which the object image is placed in the image generated by the image capturing section, and in which the detection section performs the detection process on the synthetic image in which the object image is synthesized in the path.

(9) The image processing apparatus according to (8), in which the object setting section sets a plurality of positions at which the object image is intended to be placed in the path, and in which the detection section performs the detection process on a plurality of the synthetic images each of which has the object image synthesized at each of the plurality of positions.

(10) The image processing apparatus according to any one of (1) to (9), in which the object image is generated by computer graphics.

(11) The image processing apparatus according to (10), in which the object image is generated by synthesizing a texture image and an object contour image indicating a contour of the object.

(12) The image processing apparatus according to any one of (1) to (9), in which the object image is generated by photographing the object.

(13) An image processing apparatus including:

an object setting section that sets an object image indicating an object which is placed in an image generated by an image capturing section;

a detection section that detects the object included in a synthetic image in which the object image and the image generated by the image capturing section are synthesized; and a detection parameter setting section that sets a detection parameter, which is used in a detection process performed by the detection section, on the basis of a detection result obtained by the detection section.

(14) An image processing method including:

setting an object image indicating an object which is placed in an image generated by an image capturing section;

detecting the object included in a synthetic image in which the object image and the image generated by the image capturing section are synthesized; and outputting output information for setting a detection parameter used in a detection process performed for the detecting, that is, output information in which the synthetic image and a detection result of the detection process are associated.

(15) A program causing a computer to execute:

setting an object image indicating an object which is placed in an image generated by an image capturing section;

detecting the object included in a synthetic image in which the object image and the image generated by the image capturing section are synthesized; and outputting output information for setting a detection parameter used in a detection process performed for the detecting, that is, output information in which the synthetic image and a detection result of the detection process are associated.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus comprising:
    an object setting section that generates an object image, wherein the object image is placed in an image generated by an image capturing section;
    a detection section that detects the object image included in a synthetic image in which the object image and the image generated by the image capturing section are synthesized;
    a detection parameter setting section that sets a detection parameter for a detection process performed by the detection section, the detection parameter including a registered region of the image generated by the image capturing section; and
    an output section that outputs output information based on a detection result of the detection process and issues an alarm if at least one of: (i) the object image enters into the registered region; or (ii) the object image remains within the registered region for more than a predetermined amount of time,
    wherein the detection parameter is configured to be changed based on the output information.

2. The image processing apparatus according to claim 1, wherein the detection parameter includes at least one of a parameter for setting a detection rule used when the detection process is performed and a parameter for adjusting a detection sensitivity of the detection process, and
    wherein the detection section performs the detection process by using the detection parameter.

3. The image processing apparatus according to claim 1, wherein the detection parameter includes a parameter for detecting predetermined movement of the object image included in the synthetic image, and
    wherein the detection section detects whether or not the object image included in the synthetic image performs the predetermined movement.

4. The image processing apparatus according claim 1, wherein the output section displays notification information, which is for notifying that the object image enters into the registered region, over the synthetic image.

5. The image processing apparatus according to claim 1, wherein the output section outputs notification information, which is for notifying that the object image is detected from the synthetic image, in a state where the notification information is included in the output information.

6. The image processing apparatus according to claim 1, wherein the object setting section sets appearance and movement of the object image which is placed in the image generated by the image capturing section, and
wherein the detection section performs the detection process on the synthetic image in which the object image specified by the appearance and movement of the object image is synthesized.

7. The image processing apparatus according to claim 6, wherein the object setting section sets a path in which the object image is placed in the image generated by the image capturing section, and
wherein the detection section performs the detection process on the synthetic image in which the object image is synthesized in the path.

8. The image processing apparatus according to claim 7, wherein the object setting section sets a plurality of positions at which the object image is intended to be placed in the path, and
wherein the detection section performs the detection process on a plurality of the synthetic images each of which has the object image synthesized at each of the plurality of positions.

9. The image processing apparatus according to claim 1, wherein the object image is generated by computer graphics.

10. The image processing apparatus according to claim 9, wherein the object image includes a contour image and a texture image.

11. The image processing apparatus according to claim 1, wherein the object image is generated by photographing an object.

12. An image processing apparatus comprising:
an object setting section that generates an object image, wherein the object image is placed in an image generated by an image capturing section;
a detection section that detects the object image included in a synthetic image in which the object image and the image generated by the image capturing section are synthesized; and
a detection parameter setting section that sets a detection parameter, which is used in a detection process performed by the detection section, the detection parameter including a registered region of the image generated by the image capturing section,
wherein the detection parameter is configured to be changed based on a detection result from the detection section and an alarm is issued if at least one of: (i) the object image enters into the registered region; or (ii) the object image remains within the registered region for more than a predetermined amount of time.

13. An image processing method comprising:
generating an object image which is placed in an image generated by an image capturing section;
detecting the object image included in a synthetic image in which the object image and the image generated by the image capturing section are synthesized;
setting a detection parameter for a detection process including a registered region of the image generated by the image capturing section;
outputting output information based on a detection result of the detection process; and
issuing an alarm if at least one of: (i) the object image enters into the registered region; or (ii) the object image remains within the registered region for more than a predetermined amount of time,
wherein the detection parameter is configured to be changed based on the output information.

14. A non-transitory storage medium storing a program which, when executed by a computer, causes the computer to execute:
generating an object image which is placed in an image generated by an image capturing section;
detecting the object image included in a synthetic image in which the object image and the image generated by the image capturing section are synthesized;
setting a detection parameter for a detection process including a registered region of the image generated by the image capturing section;
outputting output information based on a detection result of the detection process; and
issuing an alarm if at least one of: (i) the object image enters into the registered region; or (ii) the object image remains within the registered region for more than a predetermined amount of time,
wherein the detection parameter is configured to be changed based on the output information.

15. The image processing apparatus according to claim 1, wherein the object image includes a human body character.

* * * * *